US012176650B2

(12) United States Patent
Lu et al.

(10) Patent No.: US 12,176,650 B2
(45) Date of Patent: Dec. 24, 2024

(54) ELECTRICAL CONNECTOR WITH GUIDING STRUCTURE AND MATING GROOVE AND METHOD OF CONNECTING ELECTRICAL CONNECTOR

(71) Applicant: Amphenol East Asia Limited (Hong Kong), Kowloon (HK)

(72) Inventors: Lo-Wen (Joan) Lu, Taoyuan (TW); Sheng-Fen Sang, Taoyuan (TW)

(73) Assignee: Amphenol East Asia Limited (Hong Kong), Kowloon (HK)

( * ) Notice: Subject to any disclaimer, the term of this patent is extended or adjusted under 35 U.S.C. 154(b) by 204 days.

(21) Appl. No.: 17/736,248

(22) Filed: May 4, 2022

(65) Prior Publication Data

US 2022/0360016 A1 Nov. 10, 2022

(30) Foreign Application Priority Data

May 5, 2021 (TW) ................................ 110116298
May 5, 2021 (TW) ................................ 110205078
May 5, 2021 (TW) ................................ 110205079

(51) Int. Cl.
*H01R 13/629* (2006.01)
*H01R 12/70* (2011.01)
(Continued)

(52) U.S. Cl.
CPC ....... *H01R 13/629* (2013.01); *H01R 12/7005* (2013.01); *H01R 13/516* (2013.01); *H01R 24/60* (2013.01)

(58) Field of Classification Search
None
See application file for complete search history.

(56) References Cited

U.S. PATENT DOCUMENTS 2,996,710 A 8/1961 Pratt
3,002,162 A * 9/1961 Garstang ........... H01R 13/7197 333/183

(Continued)

FOREIGN PATENT DOCUMENTS

CN 1175101 A 3/1998
CN 1192068 A 9/1998

(Continued)

OTHER PUBLICATIONS

Chinese communication for Chinese Application No. 201580014851.4, dated Jun. 1, 2020.

(Continued)

*Primary Examiner* — Alexander Gilman
(74) *Attorney, Agent, or Firm* — Wolf, Greenfield & Sacks, P.C.

(57) ABSTRACT

An electrical connector includes: an insulating housing; a first terminal assembly disposed at least partially in the housing; a plurality of guide holes disposed in the housing and extending in an insertion direction; a guide groove disposed in the housing and extending in the insertion direction; at least one mating groove disposed in the housing and extending in the insertion direction; and, optionally, a first vent hole disposed in the housing. The guide holes, the guide groove, and the mating groove may each include an inclined wall to facilitate mating with a mating connector. The guide holes may extend from a mating surface of the housing or may extend from guide posts protruding from the mating surface of the housing. The mating groove may have a plurality of heights.

24 Claims, 16 Drawing Sheets

(51) Int. Cl.
*H01R 13/516* (2006.01)
*H01R 24/60* (2011.01)

(56) References Cited

U.S. PATENT DOCUMENTS 3,134,950 A * 5/1964 Cook .................. H03H 1/0007 333/182
3,322,885 A * 5/1967 May ........................ H01R 4/58 174/76
3,530,422 A * 9/1970 Goodman ........... H01R 12/585 361/791
3,631,381 A 12/1971 Pittman
3,786,372 A 1/1974 Epis et al.
3,825,874 A 7/1974 Peverill
3,863,181 A 1/1975 Glance et al.
3,977,757 A 8/1976 Yurtin
4,155,613 A 5/1979 Brandeau
4,195,272 A 3/1980 Boutros
4,276,523 A 6/1981 Boutros et al.
4,286,837 A * 9/1981 Yasutake ............. H01R 43/205 439/82
4,371,742 A 2/1983 Manly
4,408,255 A 10/1983 Adkins
4,447,105 A 5/1984 Ruehl
4,471,015 A 9/1984 Ebneth et al.
4,484,159 A 11/1984 Whitley
4,490,283 A 12/1984 Kleiner
4,518,651 A 5/1985 Wolfe, Jr.
4,519,664 A * 5/1985 Tillotson ........... H01R 13/6598 439/607.03
4,519,665 A 5/1985 Althouse et al.
4,632,476 A 12/1986 Schell
4,636,752 A 1/1987 Saito
4,682,129 A 7/1987 Bakermans et al.
4,687,267 A 8/1987 Header et al.
4,728,762 A 3/1988 Roth et al.
4,751,479 A 6/1988 Parr
4,761,147 A 8/1988 Gauthier
4,787,548 A 11/1988 Abbagnaro et al.
4,806,107 A 2/1989 Arnold et al.
4,846,724 A 7/1989 Sasaki et al.
4,846,727 A 7/1989 Glover et al.
4,871,316 A 10/1989 Herrell et al.
4,878,155 A 10/1989 Conley
4,948,922 A 8/1990 Varadan et al.
4,970,354 A 11/1990 Iwasa et al.
4,975,084 A 12/1990 Fedder et al.
4,992,060 A 2/1991 Meyer
5,000,700 A 3/1991 Masubuchi et al.
5,041,023 A 8/1991 Lytle
5,066,236 A 11/1991 Broeksteeg
5,141,454 A 8/1992 Garrett et al.
5,150,086 A 9/1992 Ito
5,166,527 A 11/1992 Solymar
5,168,252 A 12/1992 Naito
5,168,432 A 12/1992 Murphy et al.
5,171,161 A 12/1992 Kachlic
5,176,538 A 1/1993 Hansell, III et al.
5,266,055 A 11/1993 Naito et al.
5,280,257 A 1/1994 Cravens et al.
5,287,076 A 2/1994 Johnescu et al.
5,334,050 A 8/1994 Andrews
5,340,334 A 8/1994 Nguyen
5,346,410 A 9/1994 Moore, Jr.
5,429,520 A 7/1995 Morlion et al.
5,429,521 A 7/1995 Morlion et al.
5,433,617 A 7/1995 Morlion et al.
5,433,618 A 7/1995 Morlion et al.
5,456,619 A 10/1995 Belopolsky et al.
5,461,392 A 10/1995 Mott et al.
5,474,472 A 12/1995 Niwa et al.
5,478,253 A * 12/1995 Biechler ........... H01R 12/7005 439/108
5,484,310 A 1/1996 McNamara et al.
5,496,183 A 3/1996 Soes et al.
5,499,935 A 3/1996 Powell
5,547,385 A * 8/1996 Spangler ............ H01R 13/6485 439/108
5,551,893 A 9/1996 Johnson
5,562,497 A 10/1996 Yagi et al.
5,597,328 A 1/1997 Mouissie
5,651,702 A 7/1997 Hanning et al.
5,669,789 A 9/1997 Law
5,796,323 A 8/1998 Uchikoba et al.
5,831,491 A 11/1998 Buer et al.
5,885,088 A 3/1999 Brennan et al.
5,924,899 A 7/1999 Paagman
5,981,869 A 11/1999 Kroger
5,982,253 A 11/1999 Perrin et al.
5,993,259 A 11/1999 Stokoe et al.
6,019,616 A 2/2000 Yagi et al.
6,050,852 A * 4/2000 Wu ...................... H01R 13/629 439/97
6,093,046 A * 7/2000 Chiou ................ H01R 13/6589 439/378
6,152,747 A 11/2000 McNamara
6,168,469 B1 1/2001 Lu
6,174,202 B1 1/2001 Mitra
6,174,203 B1 1/2001 Asao
6,174,944 B1 1/2001 Chiba et al.
6,217,364 B1 * 4/2001 Miskin ............... H01R 13/6275 439/358
6,217,372 B1 4/2001 Reed
6,293,827 B1 9/2001 Stokoe
6,296,491 B1 10/2001 Pickles
6,296,496 B1 10/2001 Trammel
6,299,438 B1 10/2001 Sahagian et al.
6,299,483 B1 10/2001 Cohen et al.
6,315,615 B1 11/2001 Raistrick
6,322,395 B1 11/2001 Nishio et al.
6,328,601 B1 12/2001 Yip et al.
6,347,962 B1 2/2002 Kline
6,350,134 B1 2/2002 Fogg et al.
6,361,363 B1 3/2002 Hwang
6,364,711 B1 4/2002 Berg et al.
6,375,510 B2 4/2002 Asao
6,379,188 B1 4/2002 Cohen et al.
6,394,842 B1 5/2002 Sakurai et al.
6,398,588 B1 6/2002 Bickford
6,409,543 B1 6/2002 Astbury, Jr. et al.
6,447,170 B1 9/2002 Takahashi et al.
6,482,017 B1 11/2002 Van Doorn
6,503,103 B1 1/2003 Cohen et al.
6,506,076 B2 1/2003 Cohen et al.
6,517,360 B1 2/2003 Cohen
6,530,790 B1 3/2003 McNamara et al.
6,537,087 B2 3/2003 McNamara et al.
6,540,540 B1 * 4/2003 Tobey .................... H01R 12/83 439/157
6,540,559 B1 4/2003 Kemmick et al.
6,551,140 B2 4/2003 Billman et al.
6,554,647 B1 4/2003 Cohen et al.
6,565,387 B2 5/2003 Cohen
6,565,390 B2 5/2003 Wu
6,579,116 B2 6/2003 Brennan et al.
6,582,244 B2 6/2003 Fogg et al.
6,592,381 B2 7/2003 Cohen et al.
6,595,801 B1 7/2003 Leonard et al.
6,595,802 B1 7/2003 Watanabe et al.
6,602,095 B2 8/2003 Astbury, Jr. et al.
6,607,402 B2 8/2003 Cohen et al.
6,609,922 B2 8/2003 Torii
6,616,864 B1 9/2003 Jiang et al.
6,652,318 B1 11/2003 Winings et al.
6,652,319 B1 11/2003 Billman
6,655,966 B2 12/2003 Rothermel et al.
6,709,294 B1 3/2004 Cohen et al.
6,713,672 B1 3/2004 Stickney
6,726,492 B1 4/2004 Yu
6,743,057 B2 6/2004 Davis et al.
6,776,659 B1 8/2004 Stokoe et al.
6,786,771 B2 9/2004 Gailus
6,808,420 B2 10/2004 Whiteman, Jr. et al.
6,814,619 B1 11/2004 Stokoe et al.

(56) References Cited

U.S. PATENT DOCUMENTS 6,830,489 B2 12/2004 Aoyama
6,872,085 B1 3/2005 Cohen et al.
6,875,031 B1 4/2005 Korsunsky et al.
6,932,649 B1 8/2005 Rothermel et al.
6,979,202 B2 12/2005 Benham et al.
6,979,226 B2 12/2005 Otsu et al.
6,986,681 B2 1/2006 Tsai
7,044,794 B2 5/2006 Consoli et al.
7,057,570 B2 6/2006 Irion, II et al.
7,074,086 B2 7/2006 Cohen et al.
7,086,872 B2 8/2006 Myer et al.
7,094,102 B2 8/2006 Cohen et al.
7,104,842 B1 9/2006 Huang et al.
7,108,556 B2 9/2006 Cohen et al.
7,156,672 B2 1/2007 Fromm et al.
7,163,421 B1 1/2007 Cohen et al.
7,232,344 B1 6/2007 Gillespie et al.
7,285,018 B2 10/2007 Kenny et al.
7,316,585 B2 1/2008 Smith et al.
7,318,740 B1 1/2008 Henry et al.
7,320,614 B2 1/2008 Toda et al.
7,322,845 B2 1/2008 Regnier et al.
7,331,822 B2 2/2008 Chen n
7,335,063 B2 2/2008 Cohen et al.
7,364,464 B2 4/2008 Iino et al.
7,371,117 B2 5/2008 Gailus
7,407,413 B2 8/2008 Minich
7,467,977 B1 12/2008 Yi et al.
7,473,124 B1 1/2009 Briant et al.
7,494,383 B2 2/2009 Cohen et al.
7,540,781 B2 6/2009 Kenny et al.
7,581,990 B2 9/2009 Kirk et al.
7,588,464 B2 9/2009 Kim
7,604,502 B2 10/2009 Pan
7,645,165 B2 1/2010 Wu et al.
7,690,946 B2 4/2010 Knaub et al.
7,699,644 B2 4/2010 Szczesny et al.
7,722,401 B2 5/2010 Kirk et al.
7,727,027 B2 6/2010 Chiang et al.
7,727,028 B1 6/2010 Zhang et al.
7,731,537 B2 6/2010 Amleshi et al.
7,753,731 B2 7/2010 Cohen et al.
7,771,233 B2 8/2010 Gailus
7,789,676 B2 9/2010 Morgan et al.
7,794,240 B2 9/2010 Cohen et al.
7,794,278 B2 9/2010 Cohen et al.
7,806,729 B2 10/2010 Nguyen et al.
7,824,192 B2 11/2010 Lin et al.
7,871,296 B2 1/2011 Fowler et al.
7,874,873 B2 1/2011 Do et al.
7,883,369 B1 2/2011 Sun et al.
7,887,371 B2 2/2011 Kenny et al.
7,887,379 B2 2/2011 Kirk
7,906,730 B2 3/2011 Atkinson et al.
7,914,304 B2 3/2011 Cartier et al.
7,946,889 B2 5/2011 Mizumura
7,985,097 B2 7/2011 Gulla
7,993,147 B2 8/2011 Cole et al.
8,018,733 B2 9/2011 Jia
8,083,553 B2 12/2011 Manter et al.
8,123,544 B2 2/2012 Kobayashi
8,182,289 B2 5/2012 Stokoe et al.
8,215,968 B2 7/2012 Cartier et al.
8,216,001 B2 7/2012 Kirk
8,262,411 B2 9/2012 Kondo
8,272,877 B2 9/2012 Stokoe et al.
8,337,247 B2 12/2012 Zhu
8,348,701 B1 1/2013 Lan et al.
8,371,875 B2 2/2013 Gailus
8,382,524 B2 2/2013 Khilchenko et al.
8,440,637 B2 5/2013 Elmen
8,480,432 B2 7/2013 Wu
8,506,319 B2 8/2013 Ritter et al.
8,506,331 B2 8/2013 Wu
8,545,253 B2 10/2013 Amidon et al.
8,550,861 B2 10/2013 Cohen et al.
8,597,051 B2 12/2013 Yang et al.
8,657,627 B2 2/2014 McNamara et al.
8,715,003 B2 5/2014 Buck et al.
8,715,005 B2 5/2014 Pan
8,740,637 B2 6/2014 Wang et al.
8,764,492 B2 7/2014 Chiang
8,771,016 B2 7/2014 Atkinson et al.
8,864,506 B2 10/2014 Little
8,864,521 B2 10/2014 Atkinson et al.
8,905,777 B2 12/2014 Zhu et al.
8,926,377 B2 1/2015 Kirk et al.
8,944,831 B2 2/2015 Stoner et al.
8,968,034 B2 3/2015 Hsu
8,998,642 B2 4/2015 Manter et al.
9,004,942 B2 4/2015 Paniauqa
9,011,177 B2 4/2015 Lloyd et al.
9,022,806 B2 5/2015 Cartier, Jr. et al.
9,028,281 B2 5/2015 Kirk et al.
9,065,230 B2 6/2015 Milbrand, Jr.
9,124,009 B2 9/2015 Atkinson et al.
9,219,335 B2 12/2015 Atkinson et al.
9,225,085 B2 12/2015 Cartier, Jr. et al.
9,246,253 B1 1/2016 Defibaugh et al.
9,257,778 B2 2/2016 Buck et al.
9,257,794 B2 2/2016 Wanha et al.
9,263,835 B2 2/2016 Guo
9,281,590 B1 3/2016 Liu et al.
9,287,668 B2 3/2016 Chen et al.
9,300,074 B2 3/2016 Gailus
9,337,585 B1 5/2016 Yang
9,350,095 B2 5/2016 Arichika et al.
9,431,734 B2 8/2016 Guo et al.
9,450,344 B2 9/2016 Cartier, Jr. et al.
9,484,674 B2 11/2016 Cartier, Jr. et al.
9,509,101 B2 11/2016 Cartier, Jr. et al.
9,520,686 B2 12/2016 Hu et al.
9,520,689 B2 12/2016 Cartier, Jr. et al.
9,537,250 B2 1/2017 Kao et al.
9,640,915 B2 5/2017 Phillips
9,692,183 B2 6/2017 Phillips
9,742,132 B1 8/2017 Hsueh
9,831,605 B2 11/2017 Buck et al.
9,843,135 B2 12/2017 Guetig et al.
9,935,385 B2 4/2018 Phillips et al.
9,972,945 B1 5/2018 Huang et al.
9,997,853 B2 6/2018 Little et al.
9,997,871 B2 6/2018 Zhong
10,122,129 B2 11/2018 Milbrand, Jr. et al.
10,135,197 B2 11/2018 Little et al.
10,211,577 B2 2/2019 Milbrand, Jr. et al.
10,243,304 B2 3/2019 Kirk et al.
10,270,191 B1 4/2019 Li et al.
10,276,995 B2 4/2019 Little
10,283,910 B1 * 5/2019 Chen ........................ H01R 4/04
10,320,102 B2 6/2019 Phillips et al.
10,320,125 B2 6/2019 Ju et al.
10,348,040 B2 7/2019 Cartier, Jr. et al.
10,381,767 B1 8/2019 Milbrand, Jr. et al.
10,431,936 B2 10/2019 Horning et al.
10,439,311 B2 10/2019 Phillips et al.
10,511,128 B2 12/2019 Kirk et al.
10,541,482 B2 1/2020 Sasame et al.
10,573,987 B2 2/2020 Osaki et al.
10,601,181 B2 3/2020 Lu et al.
10,680,387 B2 6/2020 Cheng et al.
10,714,875 B2 7/2020 Wan et al.
10,777,921 B2 9/2020 Lu et al.
10,797,446 B2 10/2020 Liu et al.
10,826,214 B2 11/2020 Phillips et al.
10,833,437 B2 11/2020 Huang et al.
10,840,622 B2 11/2020 Sasame et al.
10,965,064 B2 3/2021 Hsu et al.
11,146,025 B2 10/2021 Lu et al.
11,189,971 B2 * 11/2021 Lu .......................... H01R 12/75
11,217,942 B2 * 1/2022 Lu ...................... H01R 13/6594
11,264,755 B2 3/2022 Te
11,303,065 B2 * 4/2022 Wang ................... H01R 13/631
11,381,015 B2 7/2022 Lu

(56) References Cited

U.S. PATENT DOCUMENTS

| | | | | |
|---|---|---|---|---|
| 11,444,397 | B2 | 9/2022 | Sasame et al. | |
| 11,870,171 | B2 * | 1/2024 | Guo | H01R 13/6471 |
| 2001/0012730 | A1 | 8/2001 | Ramey et al. | |
| 2001/0042632 | A1 | 11/2001 | Manov et al. | |
| 2001/0046810 | A1 | 11/2001 | Cohen et al. | |
| 2002/0042223 | A1 | 4/2002 | Belopolsky et al. | |
| 2002/0061671 | A1 | 5/2002 | Torii | |
| 2002/0089464 | A1 | 7/2002 | Joshi | |
| 2002/0098738 | A1 | 7/2002 | Astbury et al. | |
| 2002/0111068 | A1 | 8/2002 | Cohen et al. | |
| 2002/0111069 | A1 | 8/2002 | Astbury et al. | |
| 2002/0123266 | A1 | 9/2002 | Ramey et al. | |
| 2002/0132518 | A1 | 9/2002 | Kobayashi | |
| 2002/0146926 | A1 | 10/2002 | Fogg et al. | |
| 2003/0119360 | A1 | 6/2003 | Jiang et al. | |
| 2003/0220018 | A1 | 11/2003 | Winings et al. | |
| 2004/0005815 | A1 | 1/2004 | Mizumura et al. | |
| 2004/0020674 | A1 | 2/2004 | McFadden et al. | |
| 2004/0058572 | A1 | 3/2004 | Fromm et al. | |
| 2004/0115968 | A1 | 6/2004 | Cohen | |
| 2004/0121652 | A1 | 6/2004 | Gailus | |
| 2004/0171305 | A1 | 9/2004 | McGowan et al. | |
| 2004/0196112 | A1 | 10/2004 | Welbon et al. | |
| 2004/0235352 | A1 | 11/2004 | Takemasa | |
| 2004/0259419 | A1 | 12/2004 | Payne et al. | |
| 2005/0048818 | A1 | 3/2005 | Pan | |
| 2005/0048838 | A1 | 3/2005 | Korsunsky et al. | |
| 2005/0048842 | A1 | 3/2005 | Benham et al. | |
| 2005/0070160 | A1 | 3/2005 | Cohen et al. | |
| 2005/0133245 | A1 | 6/2005 | Katsuyama et al. | |
| 2005/0176835 | A1 | 8/2005 | Kobayashi et al. | |
| 2005/0233610 | A1 | 10/2005 | Tutt et al. | |
| 2005/0283974 | A1 | 12/2005 | Richard et al. | |
| 2005/0287869 | A1 | 12/2005 | Kenny et al. | |
| 2006/0019525 | A1 | 1/2006 | Lloyd et al. | |
| 2006/0068640 | A1 | 3/2006 | Gailus | |
| 2006/0134993 | A1 * | 6/2006 | Dawiedczyk | H01R 13/631 439/676 |
| 2006/0160429 | A1 * | 7/2006 | Dawiedczyk | H01R 12/727 439/676 |
| 2006/0166560 | A1 | 7/2006 | Shuey et al. | |
| 2006/0255876 | A1 | 11/2006 | Kushta et al. | |
| 2006/0276082 | A1 | 12/2006 | Hung et al. | |
| 2006/0292932 | A1 | 12/2006 | Benham et al. | |
| 2007/0004282 | A1 | 1/2007 | Cohen et al. | |
| 2007/0004828 | A1 | 1/2007 | Khabbaz | |
| 2007/0021000 | A1 | 1/2007 | Laurx | |
| 2007/0021001 | A1 | 1/2007 | Laurx et al. | |
| 2007/0021002 | A1 | 1/2007 | Laurx et al. | |
| 2007/0021003 | A1 | 1/2007 | Laurx et al. | |
| 2007/0021004 | A1 | 1/2007 | Laurx et al. | |
| 2007/0037419 | A1 | 2/2007 | Sparrowhawk | |
| 2007/0042639 | A1 | 2/2007 | Manter et al. | |
| 2007/0054554 | A1 | 3/2007 | Do et al. | |
| 2007/0059961 | A1 | 3/2007 | Cartier et al. | |
| 2007/0155241 | A1 | 7/2007 | Lappohn | |
| 2007/0197063 | A1 | 8/2007 | Ngo et al. | |
| 2007/0218765 | A1 | 9/2007 | Cohen et al. | |
| 2007/0243764 | A1 | 10/2007 | Liu et al. | |
| 2007/0293084 | A1 | 12/2007 | Ngo | |
| 2008/0020640 | A1 | 1/2008 | Zhang et al. | |
| 2008/0194146 | A1 | 8/2008 | Gailus | |
| 2008/0246555 | A1 | 10/2008 | Kirk et al. | |
| 2008/0248658 | A1 | 10/2008 | Cohen et al. | |
| 2008/0248659 | A1 | 10/2008 | Cohen et al. | |
| 2008/0248660 | A1 | 10/2008 | Kirk et al. | |
| 2009/0011641 | A1 | 1/2009 | Cohen et al. | |
| 2009/0011645 | A1 | 1/2009 | Laurx et al. | |
| 2009/0035955 | A1 | 2/2009 | McNamara | |
| 2009/0061661 | A1 | 3/2009 | Shuey et al. | |
| 2009/0117386 | A1 | 5/2009 | Vacanti et al. | |
| 2009/0203259 | A1 | 8/2009 | Nguyen et al. | |
| 2009/0239395 | A1 | 9/2009 | Cohen et al. | |
| 2009/0258516 | A1 | 10/2009 | Hiew et al. | |
| 2009/0291593 | A1 | 11/2009 | Atkinson et al. | |
| 2009/0305530 | A1 | 12/2009 | Ito et al. | |
| 2009/0305533 | A1 | 12/2009 | Feldman et al. | |
| 2009/0305553 | A1 | 12/2009 | Thomas et al. | |
| 2010/0048058 | A1 | 2/2010 | Morgan et al. | |
| 2010/0068934 | A1 | 3/2010 | Li et al. | |
| 2010/0075538 | A1 | 3/2010 | Ohshida | |
| 2010/0081302 | A1 | 4/2010 | Atkinson et al. | |
| 2010/0112846 | A1 | 5/2010 | Kotaka | |
| 2010/0124851 | A1 | 5/2010 | Xiong et al. | |
| 2010/0144167 | A1 | 6/2010 | Fedder et al. | |
| 2010/0203772 | A1 | 8/2010 | Mao et al. | |
| 2010/0291806 | A1 | 11/2010 | Minich et al. | |
| 2010/0294530 | A1 | 11/2010 | Atkinson et al. | |
| 2011/0003509 | A1 | 1/2011 | Gailus | |
| 2011/0067237 | A1 | 3/2011 | Cohen et al. | |
| 2011/0104948 | A1 | 5/2011 | Girard, Jr. et al. | |
| 2011/0130038 | A1 | 6/2011 | Cohen et al. | |
| 2011/0143605 | A1 | 6/2011 | Pepe | |
| 2011/0212649 | A1 | 9/2011 | Stokoe et al. | |
| 2011/0212650 | A1 | 9/2011 | Amleshi et al. | |
| 2011/0230095 | A1 | 9/2011 | Atkinson et al. | |
| 2011/0230096 | A1 | 9/2011 | Atkinson et al. | |
| 2011/0256739 | A1 | 10/2011 | Toshiyuki et al. | |
| 2011/0287663 | A1 | 11/2011 | Gailus et al. | |
| 2012/0094536 | A1 | 4/2012 | Khilchenko et al. | |
| 2012/0156929 | A1 | 6/2012 | Manter et al. | |
| 2012/0184145 | A1 | 7/2012 | Zeng | |
| 2012/0184154 | A1 | 7/2012 | Frank et al. | |
| 2012/0202363 | A1 | 8/2012 | McNamara et al. | |
| 2012/0202386 | A1 | 8/2012 | McNamara et al. | |
| 2012/0214344 | A1 | 8/2012 | Cohen et al. | |
| 2013/0012038 | A1 | 1/2013 | Kirk et al. | |
| 2013/0017733 | A1 | 1/2013 | Kirk et al. | |
| 2013/0065454 | A1 | 3/2013 | Milbrand Jr. | |
| 2013/0078870 | A1 | 3/2013 | Milbrand, Jr. | |
| 2013/0078871 | A1 | 3/2013 | Milbrand, Jr. | |
| 2013/0090001 | A1 | 4/2013 | Kagotani | |
| 2013/0109232 | A1 | 5/2013 | Paniaqua | |
| 2013/0143442 | A1 | 6/2013 | Cohen et al. | |
| 2013/0196553 | A1 | 8/2013 | Gailus | |
| 2013/0217263 | A1 | 8/2013 | Pan | |
| 2013/0225006 | A1 | 8/2013 | Khilchenko et al. | |
| 2013/0237100 | A1 | 9/2013 | Affeltranger | |
| 2013/0316590 | A1 | 11/2013 | Hon | |
| 2014/0004724 | A1 | 1/2014 | Cartier, Jr. et al. | |
| 2014/0004726 | A1 | 1/2014 | Cartier, Jr. et al. | |
| 2014/0004746 | A1 | 1/2014 | Cartier, Jr. et al. | |
| 2014/0024263 | A1 | 1/2014 | Dong et al. | |
| 2014/0057498 | A1 | 2/2014 | Cohen | |
| 2014/0113487 | A1 | 4/2014 | Chen et al. | |
| 2014/0273557 | A1 | 9/2014 | Cartier, Jr. et al. | |
| 2014/0273627 | A1 | 9/2014 | Cartier, Jr. et al. | |
| 2014/0370729 | A1 | 12/2014 | Wang | |
| 2014/0377992 | A1 | 12/2014 | Chang et al. | |
| 2015/0056856 | A1 | 2/2015 | Atkinson et al. | |
| 2015/0072546 | A1 | 3/2015 | Li | |
| 2015/0099408 | A1 | 4/2015 | Myer et al. | |
| 2015/0111401 | A1 | 4/2015 | Guo | |
| 2015/0111427 | A1 | 4/2015 | Wu et al. | |
| 2015/0126068 | A1 | 5/2015 | Fang | |
| 2015/0140866 | A1 | 5/2015 | Tsai et al. | |
| 2015/0214673 | A1 | 7/2015 | Gao et al. | |
| 2015/0236451 | A1 | 8/2015 | Cartier, Jr. et al. | |
| 2015/0236452 | A1 | 8/2015 | Cartier, Jr. et al. | |
| 2015/0255904 | A1 | 9/2015 | Ito | |
| 2015/0255926 | A1 | 9/2015 | Paniagua | |
| 2015/0340798 | A1 | 11/2015 | Kao et al. | |
| 2016/0149343 | A1 | 5/2016 | Atkinson et al. | |
| 2016/0268744 | A1 | 9/2016 | Little et al. | |
| 2017/0077654 | A1 | 3/2017 | Yao et al. | |
| 2017/0352970 | A1 | 12/2017 | Liang et al. | |
| 2018/0062323 | A1 | 3/2018 | Kirk et al. | |
| 2018/0076555 | A1 | 3/2018 | Scholeno et al. | |
| 2018/0145438 | A1 | 5/2018 | Cohen | |
| 2018/0198220 | A1 | 7/2018 | Sasame et al. | |
| 2018/0205177 | A1 | 7/2018 | Zhou et al. | |
| 2018/0212376 | A1 | 7/2018 | Wang et al. | |
| 2018/0212385 | A1 | 7/2018 | Little | |
| 2018/0219331 | A1 | 8/2018 | Cartier, Jr. et al. | |

(56) References Cited

U.S. PATENT DOCUMENTS

| | | | |
|---|---|---|---|
| 2018/0241156 A1 | 8/2018 | Huang et al. | |
| 2018/0269607 A1 | 9/2018 | Wu et al. | |
| 2018/0331444 A1 | 11/2018 | Ono | |
| 2019/0006778 A1 | 1/2019 | Fan et al. | |
| 2019/0044284 A1 | 2/2019 | Dunham | |
| 2019/0052019 A1 | 2/2019 | Huang et al. | |
| 2019/0067854 A1* | 2/2019 | Ju | H01R 13/46 |
| 2019/0173209 A1 | 6/2019 | Lu et al. | |
| 2019/0173232 A1 | 6/2019 | Lu et al. | |
| 2019/0214755 A1 | 7/2019 | Manickam | |
| 2019/0334292 A1 | 10/2019 | Cartier, Jr. et al. | |
| 2020/0021052 A1 | 1/2020 | Milbrand, Jr. et al. | |
| 2020/0076135 A1 | 3/2020 | Tang et al. | |
| 2020/0083627 A1* | 3/2020 | Peloza | H01R 13/6587 |
| 2020/0153134 A1 | 5/2020 | Sasame et al. | |
| 2020/0161811 A1 | 5/2020 | Lu | |
| 2020/0203865 A1 | 6/2020 | Wu et al. | |
| 2020/0203867 A1 | 6/2020 | Lu | |
| 2020/0203886 A1 | 6/2020 | Wu et al. | |
| 2020/0235529 A1 | 7/2020 | Kirk et al. | |
| 2020/0259294 A1* | 8/2020 | Lu | H01R 12/57 |
| 2020/0266584 A1 | 8/2020 | Lu | |
| 2020/0274269 A1* | 8/2020 | Teh | H01R 12/7005 |
| 2020/0335914 A1 | 10/2020 | Hsu et al. | |
| 2020/0358226 A1 | 11/2020 | Lu et al. | |
| 2020/0395698 A1 | 12/2020 | Hou et al. | |
| 2020/0403350 A1 | 12/2020 | Hsu | |
| 2021/0036452 A1 | 2/2021 | Phillips et al. | |
| 2021/0050683 A1 | 2/2021 | Sasame et al. | |
| 2021/0126404 A1* | 4/2021 | Laurx | H01R 13/629 |
| 2021/0135389 A1 | 5/2021 | Jiang | |
| 2021/0135403 A1 | 5/2021 | Yang et al. | |
| 2021/0135404 A1 | 5/2021 | Jiang | |
| 2021/0203104 A1 | 7/2021 | Chen | |
| 2021/0218195 A1 | 7/2021 | Hsu et al. | |
| 2021/0399449 A1 | 12/2021 | Guo et al. | |
| 2022/0059954 A1 | 2/2022 | Yue | |
| 2022/0069496 A1 | 3/2022 | Yi et al. | |
| 2022/0077632 A1 | 3/2022 | Chen et al. | |
| 2022/0336980 A1 | 10/2022 | Lu | |

FOREIGN PATENT DOCUMENTS

| | | | |
|---|---|---|---|
| CN | 1275825 | A | 12/2000 |
| CN | 2519434 | Y | 10/2002 |
| CN | 1179448 | C | 12/2004 |
| CN | 1650479 | A | 8/2005 |
| CN | 1799290 | A | 7/2006 |
| CN | 2896615 | Y | 5/2007 |
| CN | 1996678 | A | 7/2007 |
| CN | 2930006 | Y | 8/2007 |
| CN | 101019277 | A | 8/2007 |
| CN | 101176389 | A | 5/2008 |
| CN | 101208837 | A | 6/2008 |
| CN | 101312275 | A | 11/2008 |
| CN | 201323275 | Y | 10/2009 |
| CN | 101600293 | A | 12/2009 |
| CN | 201374434 | Y | 12/2009 |
| CN | 101752700 | A | 6/2010 |
| CN | 101790818 | A | 7/2010 |
| CN | 101120490 | B | 11/2010 |
| CN | 101926055 | A | 12/2010 |
| CN | 201846527 | U | 5/2011 |
| CN | 102106041 | A | 6/2011 |
| CN | 201868621 | U | 6/2011 |
| CN | 102195173 | A | 9/2011 |
| CN | 102224640 | A | 10/2011 |
| CN | 102232259 | A | 11/2011 |
| CN | 102239605 | A | 11/2011 |
| CN | 102292881 | A | 12/2011 |
| CN | 101600293 | B | 5/2012 |
| CN | 102456990 | A | 5/2012 |
| CN | 102487166 | A | 6/2012 |
| CN | 102593661 | A | 7/2012 |
| CN | 102598430 | A | 7/2012 |
| CN | 202395248 | U | 8/2012 |
| CN | 102694318 | A | 9/2012 |
| CN | 102738621 | A | 10/2012 |
| CN | 102859805 | A | 1/2013 |
| CN | 202695788 | U | 1/2013 |
| CN | 202695861 | U | 1/2013 |
| CN | 203445304 | U | 2/2014 |
| CN | 103840285 | A | 6/2014 |
| CN | 203690614 | U | 7/2014 |
| CN | 204030057 | U | 12/2014 |
| CN | 204167554 | U | 2/2015 |
| CN | 104409906 | A | 3/2015 |
| CN | 104577577 | A | 4/2015 |
| CN | 104659573 | A | 5/2015 |
| CN | 204349140 | U | 5/2015 |
| CN | 204577746 | U | 8/2015 |
| CN | 204696287 | U | 10/2015 |
| CN | 105633660 | A | 6/2016 |
| CN | 105703103 | A | 6/2016 |
| CN | 106099546 | A | 11/2016 |
| CN | 107069281 | A | 8/2017 |
| CN | 304240766 | S | 8/2017 |
| CN | 304245430 | S | 8/2017 |
| CN | 206712072 | U | 12/2017 |
| CN | 206712089 | U | 12/2017 |
| CN | 107706632 | A | 2/2018 |
| CN | 207677189 | U | 7/2018 |
| CN | 208078300 | U | 11/2018 |
| CN | 208209042 | U | 12/2018 |
| CN | 208797273 | U | 4/2019 |
| CN | 210326355 | U | 4/2020 |
| CN | 112072400 | A | 12/2020 |
| CN | 212412336 | U | 1/2021 |
| CN | 107706675 | B | 4/2021 |
| CN | 212874843 | U | 4/2021 |
| CN | 113517619 | A | 10/2021 |
| DE | 60216728 | T2 | 11/2007 |
| EP | 0 560 551 | A1 | 9/1993 |
| EP | 0 820 124 | A2 | 1/1998 |
| EP | 1 018 784 | A1 | 7/2000 |
| EP | 1 779 472 | A1 | 5/2007 |
| EP | 2 169 770 | A2 | 3/2010 |
| EP | 2 405 537 | A1 | 1/2012 |
| GB | 1049435 | A | 11/1966 |
| GB | 1272347 | A | 4/1972 |
| JP | H3-156761 | A2 | 7/1991 |
| JP | H07-302649 | A | 11/1995 |
| JP | 2001-510627 | A | 7/2001 |
| JP | 2002-151190 | A2 | 5/2002 |
| JP | 2006-344524 | A | 12/2006 |
| JP | 2010-129173 | A | 6/2010 |
| MX | 9907324 | A1 | 8/2000 |
| TW | 200835073 | A | 8/2008 |
| TW | M357771 | U | 5/2009 |
| TW | M474278 | U | 3/2014 |
| TW | M502979 | U | 6/2015 |
| TW | I535129 | B | 5/2016 |
| TW | M534922 | U | 1/2017 |
| TW | I596840 | B | 8/2017 |
| TW | M558481 | U | 4/2018 |
| TW | M558482 | U | 4/2018 |
| TW | M558483 | U | 4/2018 |
| TW | M559006 | U | 4/2018 |
| TW | M559007 | U | 4/2018 |
| TW | M560138 | U | 5/2018 |
| TW | M562507 | U | 6/2018 |
| TW | M565894 | Y | 8/2018 |
| TW | M565895 | Y | 8/2018 |
| TW | M565899 | Y | 8/2018 |
| TW | M565900 | Y | 8/2018 |
| TW | M565901 | Y | 8/2018 |
| TW | M605564 | U | 12/2020 |
| TW | M613035 | U | 6/2021 |
| WO | WO 88/05218 | A1 | 7/1988 |
| WO | WO 98/35409 | A1 | 8/1998 |
| WO | WO 2004/059794 | A2 | 7/2004 |
| WO | WO 2004/059801 | A1 | 7/2004 |
| WO | WO 2006/039277 | A1 | 4/2006 |
| WO | WO 2007/005597 | A2 | 1/2007 |

(56) References Cited

FOREIGN PATENT DOCUMENTS

| | | | |
|---|---|---|---|
| WO | WO 2007/005599 | A1 | 1/2007 |
| WO | WO 2008/124052 | A2 | 10/2008 |
| WO | WO 2008/124054 | A2 | 10/2008 |
| WO | WO 2008/124057 | A2 | 10/2008 |
| WO | WO 2008/124101 | A2 | 10/2008 |
| WO | WO 2010/030622 | A1 | 3/2010 |
| WO | WO 2010/039188 | A1 | 4/2010 |
| WO | WO 2011/100740 | A2 | 8/2011 |
| WO | WO 2017/007429 | A1 | 1/2017 |

OTHER PUBLICATIONS

Chinese Office Action for Chinese Application No. 201580014851.4 dated Sep. 4, 2019.

Chinese Office Action for Application No. 201680051491.X dated Apr. 30, 2019.

Chinese Office Action for Chinese Application No. 201780064531.9 dated Jan. 2, 2020.

Chinese Office Action for Chinese Application No. 201780097919.9, dated Dec. 3, 2021.

Chinese Office Action for Chinese Application No. 201780097919.9, dated Mar. 10, 2021.

Chinese Office Action dated Jan. 18, 2021 in connection with Chinese Application No. 202010031395.7.

Extended European Search Report for European Application No. EP 11166820.8 mailed Jan. 24, 2012.

European Communication Pursuant to Article 94(3) EPC dated Sep. 8, 2022 for European Application No. 17930428.2.

Extended European Search Report dated May 19, 2021 in connection with European Application No. 17930428.2.

International Search Report and Written Opinion for International Application No. PCT/CN2017/108344 dated Aug. 1, 2018.

International Preliminary Report on Patentability Chapter II for International Application No. PCT/CN2017/108344 mailed Mar. 6, 2020.

International Search Report and Written Opinion mailed Jul. 18, 2019 for International Application No. PCT/CN2018/118798.

International Search Report and Written Opinion mailed Nov. 29, 2021 for International Application No. PCT/CN2021/114671.

International Preliminary Report on Patentability for International Application No. PCT/SG2016/050317 dated Jan. 18, 2018.

International Search Report and Written Opinion for International Application No. PCT/SG2016/050317 dated Oct. 18, 2016.

International Search Report with Written Opinion for International Application No. PCT/US2006/025562 mailed Oct. 31, 2007.

International Search Report and Written Opinion for International Application No. PCT/US2005/034605 mailed Jan. 26, 2006.

International Preliminary Report on Patentability for International Application No. PCT/US2010/056482 mailed May 24, 2012.

International Search Report and Written Opinion for International Application No. PCT/US2010/056482 mailed Mar. 14, 2011.

International Preliminary Report on Patentability for International Application No. PCT/US2011/026139 mailed Sep. 7, 2012.

International Search Report and Written Opinion for International Application No. PCT/US2011/026139 mailed Nov. 22, 2011.

International Search Report and Written Opinion for International Application No. PCT/US2011/034747 mailed Jul. 28, 2011.

International Preliminary Report on Patentability for International Application No. PCT/US2012/023689 mailed Aug. 15, 2013.

International Search Report and Written Opinion for International Application No. PCT/US2012/023689 mailed Sep. 12, 2012.

International Search Report and Written Opinion for International Application No. PCT/US2012/060610 mailed Mar. 29, 2013.

International Search Report and Written Opinion for International Application No. PCT/US2015/012463 mailed May 13, 2015.

International Search Report and Written Opinion for International Application No. PCT/US2017/047905 dated Dec. 4, 2017.

Taiwanese Office Action dated Jun. 16, 2022 for Taiwan Application No. 107138468.

[No Author Listed], Carbon Nanotubes for Electromagnetic Interference Shielding. SBIR/STTR. Award Information. Program Year 2001. Fiscal Year 2001. Materials Research Institute, LLC. Chu et al. Available at http://sbir.gov/sbirsearch/detail/225895. Last accessed Sep. 19, 2013.

[No Author Listed], High Speed Backplane Connectors. Tyco Electronics. Product Catalog No. 1773095. Revised Dec. 2008. 1-40 pages.

[No Author Listed], MCIO 124pos 85ohm. Amphenol Assembletech. 1 page. URL:http://www.amphenol-ast.com/v3/en/overview.aspx?classId=234 [retrieved on Apr. 11, 2022].

[No Author Listed], Military Fibre Channel High Speed Cable Assembly. www.gore.com. 2008. [last accessed Aug. 2, 2012 via Internet Archive: Wayback Machine http://web.archive.org] Link archived: http://www.gore.com/en.sub.--xx/products/cables/copper/networking/militar-y/military.sub.--fibre . . . Last archive date Apr. 6, 2008.

[No Author Listed], Mini Cool Edge IO—The Ideal Solution to Transmit Next Generation High-Speed Signal to Designated Area in Your System. Jul. 25, 2018. 2 pages. URL:https://www.amphenol-icc.com/connect/mini-cool-edge-io-the-ideal-solution-to-transmit-next-generation-high-speedsignal.html [retrieved on Apr. 11, 2022].

[No Author Listed], Mini Cool Edge IO Connector. Commercial IO. Amphenol ICC. 5 pages. URL:https://cdn.amphenol-icc.com/media/wysiwyg/files/documentation/datasheet/inputoutput/io_mini_cool_edge_io.pdf [retrieved on Apr. 11, 2022].

[No Author Listed], SFF-TA-1016 Specification for Internal Unshielded High Speed Connector System. Rev 0.0.1. SNIA SFF TWG Technology Affiliate. Nov. 15, 2019. 40 pages.

Beaman, High Performance Mainframe Computer Cables. 1997 Electronic Components and Technology Conference. 1997;911-7.

Hsu, Compact Electrical Connector, U.S. Appl. No. 17/867,067, filed Jul. 18, 2022.

Reich et al., Microwave Theory and Techniques. Boston Technical Publishers, Inc. 1965;182-91.

Sasame et al., Electrical connector with cavity between terminals, U.S. Appl. No. 17/942,435, filed Sep. 12, 2022.

Shi et al. Improving Signal Integrity in Circuit Boards by Incorporating Absorbing Materials. 2001 Proceedings. 51st Electronic Components and Technology Conference, Orlando FL. 2001:1451-56.

* cited by examiner

ELECTRICAL CONNECTOR WITH GUIDING STRUCTURE AND MATING GROOVE AND METHOD OF CONNECTING ELECTRICAL CONNECTOR

CROSS-REFERENCE TO RELATED APPLICATION

The present application claims priority under 35 U.S.C. § 119 to Taiwan Application No. 110116298 filed in the Taiwan Patent Office on May 5, 2021, Taiwan Application No. 110205078 filed in the Taiwan Patent Office on May 5, 2021, Taiwan Application No. 110205079 filed in the Taiwan Patent Office on May 5, 2021. These three priority applications are incorporated herein by reference in their entireties.

FIELD OF THE DISCLOSURE

The present disclosure relates to an electrical connector and a connection method for the electrical connector, in which the electrical connector has a configuration that is able to provide a reliable and secure connection to a mating connector in a "blind" mating operation (i.e., without requiring an operator to observe whether an alignment is proper between the electrical connector with the mating connector during the mating operation). More specifically, the present disclosure relates to an electrical connector and a connection method for the electrical connector, in which the electrical connector has a guiding structure and/or a mating groove that facilitates a reliable and secure connection to a mating connector in a blind mating operation.

BACKGROUND

In order to be able to receive and/or transmit electrical signals and power, electronic devices of all kinds (e.g., smartphones, tablet computers, desktop computers, notebook computers, digital cameras, etc.) have used electrical connectors. For example, to receive and/or transmit electrical signals and/or power from an external device, an electronic device may utilize an electrical connector to interconnect the devices. In another example, to receive and/or transmit signals within an electronic device, e.g., between circuit boards located at different regions of the electronic device, an electrical connector that fits within the electronic device's body may be utilized. In general, the term "electrical connector" may refer broadly to all devices for connecting elements together and carrying electrical signals and/or power between the connected elements.

An electrical connector may be a bridge for transferring signals to/from key components of an electronic device. Therefore, the quality of the electrical connector may affect the reliability of electrical transmissions (e.g., current, voltage, power, signals), and such reliability may be closely linked to reliability of operation of the electronic device. Further, because electrical connectors may function to interconnect multiple electronic devices to form a complete system, reliable operation of an entire system may be affected by the reliability of any one or more of the system's electrical connectors. Thus, it can be seen that electrical connectors that operate reliably are elements that are indispensable to electronic devices and that enable electronic devices to carry out their predetermined functions.

Electrical connectors may have many different types of structures, which have been adapted to accommodate the variety of different uses and/or mounting positions demanded by the electronic devices in which the signal connectors are deployed. For example, when a main unit of an electronic device (e.g., desktop computer, servo, on-board computer, etc.) has a relatively large volume, or when a mounting position is complex or concealed, manufacturers may opt to use a wired connector-design structure so that the bendable property of wires can be used advantageously to enable flexibility in the length(s) of the wire(s) used to connect an electronic device to another electronic device reliably. When available space is not a concern, the use of wires may provide flexibility in enabling interconnection of a component (e.g., a circuit board) in the electronic device to another component in the electronic device or in other electronic device, so as to be enable signal and/or power transmission between the components.

However, as designs of electronic devices of all kinds become more and more compact and lightweight, the structures of electrical connectors of all types have become more and more compact and lightweight, and consequently the features of the electrical connectors have become more and more precise. As the size of electrical connectors of all types becomes smaller and more precise, a concern is that the structural strength of these electrical connectors could be weakened, i.e., they could become more fragile, which could affect their transmission performance by increasing the possibility of an unstable connection. An additional concern is that, with their increased fragility, the service life of the electrical connectors could be shortened by incorrect handling causing weaking or damage to the structural integrity of the electrical connectors. For example, in the process of plugging and unplugging a conventional plug connector with a corresponding receptacle connector (especially in blind mating operations), a user could apply force improperly, and/or there could be a deviation from a correct direction or orientation when force is applied during plugging, and/or there could be a deviation from a proper alignment angle between the plug and receptacle connectors, and/or there could be a shift from a proper alignment position between the plug and receptacle connectors. Such erroneous handling could cause deformation and damage to an insulating body or housing of the connector. Thus, solving the question of how to effectively avoid the above-mentioned problems is an important task.

SUMMARY OF THE DISCLOSURE

With an understanding of the challenges of conventional electrical connectors and the need for improvement, and also with an understanding of the concerns of a fiercely competitive market, the inventors have recognized and appreciated designs for an electrical connector that facilitates proper mating of electrical connectors in situations where a user may not have a direct view of the electrical connectors during mating operation and therefore may need to perform a blind mating operation.

According to an aspect of the present invention, an electrical connector is provided that may be comprised of: an insulative housing; a first terminal assembly disposed at least partially in the housing; a plurality of first guide features supported by the housing, each of the first guide features extending parallel to an insertion direction; a second guide feature supported by the housing and extending parallel to the insertion direction; and a first mating feature supported by the housing and extending parallel to the insertion direction, the first mating feature being configured to contact a first contact portion of a mating connector and to enable the first contact portion to contact the first terminal assembly.

In some embodiments of this aspect, each of the first guide features may extend from a mating surface of the housing such that a surface edge of each of the first guide features coincides with the mating surface of the housing.

In some embodiments of this aspect, the electrical connector may further be comprised of a plurality of guide posts protruding from a mating surface of the housing. The first guide features may be guide holes respectively disposed in the guide posts such that a surface edge of each of the guide holes coincides with a mating surface of a corresponding one of the guide posts.

In some embodiments of this aspect, each of the first guide features may be comprised of an end portion that includes an inclined wall. In some embodiments, the inclined wall may have a frustoconical shape.

In some embodiments of this aspect, each of the first guide features may be spaced apart from the first mating feature.

In some embodiments of this aspect, the first mating feature may be positioned between and contiguous with two of the first guide features.

In some embodiments of this aspect, the second guide feature may be comprised of a plurality of inclined surfaces located at an outer edge of the second guide feature. Each of the inclined surfaces may be inclined relative to a mating surface of the housing.

In some embodiments of this aspect, an edge of a mating surface of the housing may have a stepped structure comprised of at least three steps of different heights.

In some embodiments of this aspect, a dimension d1 of the first guide features in a direction parallel to the insertion direction may be different from a dimension d2 of end sections of the first mating feature. In some embodiments, a dimension d3 of the second guide feature may be different from d1 and different from d2.

In some embodiments of this aspect, the electrical connector may further be comprised of a plurality of third guide features supported by the housing, each of the third guide features extending parallel to the insertion direction. The first mating feature may be positioned between two of the third guide features. In some embodiments, the first mating feature may be elongated in a longitudinal direction perpendicular to the insertion direction; the first mating feature, the first guide features, and the two of the third guide features may have a common first centerline extending in the longitudinal direction; and the first mating feature and the second guide feature may have a common second centerline extending in a vertical direction perpendicular to the longitudinal direction and perpendicular to the insertion direction.

In some embodiments of this aspect, the insulative housing may be comprised of a mating surface having an edge. The first mating feature may be a mating groove extending into the mating surface. The second guide feature may be a second groove extending into the mating surface adjacent the edge.

According to another aspect of the present invention, an electrical connector is provided that may be comprised of: an insulative housing; a first terminal assembly disposed at least partially in the housing; a plurality of guide holes disposed in the housing, each of the guide holes extending parallel to an insertion direction; a guide groove disposed in the housing and extending parallel to the insertion direction; a first mating groove disposed in the housing and extending parallel to the insertion direction, the first mating groove being configured to receive a first contact portion of a mating connector and to enable the first contact portion to contact the first terminal assembly; and a first vent hole disposed in the housing, wherein a portion of the first terminal assembly is directly exposed through the first vent hole. The first mating groove may be comprised of a central section positioned between two end sections, with a height of the central section in a direction perpendicular to the insertion direction being smaller than a height of each of end sections.

In some embodiments of this aspect, an edge portion of each of the end sections of the first mating groove may have a curved shape adjacent the mating surface of the housing.

In some embodiments of this aspect, each of the end sections of the first mating groove may be comprised of at least one inclined wall.

In some embodiments of this aspect, the electrical connector may further be comprised of: a second terminal assembly disposed at least partially in the housing; and a second mating groove disposed in the housing and extending parallel to the insertion direction. The second mating groove may be configured to receive a second contact portion of the mating connector and to enable the second contact portion to contact the second terminal assembly.

In some embodiments of this aspect, the electrical connector may further be comprised of a plurality of guide posts protruding from a mating surface of the housing. The guide holes may be respectively disposed in the guide posts such that a surface edge of each of the guide holes coincides with a mating surface of a corresponding one of the guide posts.

In some embodiments of this aspect, a portion of each of the guide holes may be located between the first and second mating grooves.

According to another aspect of the present invention, a method of connecting electrical connectors is provided. The method may be comprised of: bringing together first and second electrical connectors such that an end of a first protrusion of the first connector is within an outer perimeter of a first opening of the second connector; performing a first alignment by causing the end of the first protrusion of the first connector to slide along an inclined wall adjacent the outer perimeter of the first opening of the second connector, to align the first protrusion of the first connector in the first opening of the second connector; after the first alignment, performing a second alignment by causing an end of a second protrusion of the first connector to be centered with a second opening of second connector; causing a third protrusion of the first connector to engage with a third opening of the second connector; and applying a mating force in an insertion direction to seat the first protrusion in the first opening, to seat the second protrusion in the second opening, and to seat the third protrusion in the third opening.

In some embodiments of this aspect, the performing of the first alignment may cause the first and second connectors to shift in a direction perpendicular to the insertion direction by approximately 2 mm or less.

In some embodiments of this aspect, the first protrusion posts may extend a distance D1 from a mating surface of the first connector, the second protrusion may extend a distance D2 from the mating surface, with D2 being less than D1, and the third protrusion may extend a distance D3 from the mating surface, with D3 being less than D2.

In some embodiments of this aspect, the performing of the second alignment may be comprised of causing an inclined wall of the second protrusion to move relative to an inclined wall of the second opening, and the causing of the third protrusion to engage with the third opening may be comprised of causing an end of the third protrusion to move relative to an inclined wall of the third opening.

The foregoing features may be included or may be used, separately or together in any combination, in any of the embodiments of the invention discussed herein.

BRIEF DESCRIPTION OF THE DRAWINGS

Various aspects and embodiments of the present technology disclosed herein are described below with reference to the accompanying drawings. It should be appreciated that the figures shown in the drawings are not necessarily drawn to scale. Items appearing in multiple figures may be indicated by the same reference numeral. For the purposes of clarity, not every component may be labeled in every figure.

DETAILED DESCRIPTION

Figure 1A:
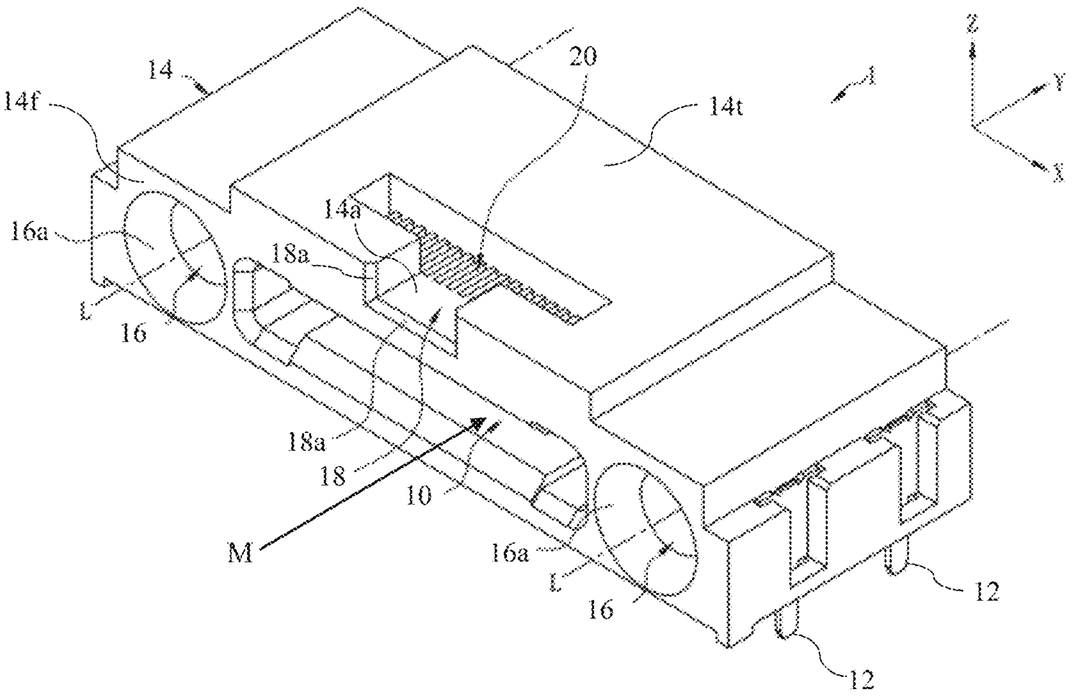
FIG. 1A shows a top front perspective view of an electrical connector, according to some embodiments of the present invention.

The inventors have recognized and appreciated various design techniques for electrical connectors that enable an electrical connector (e.g., a receptacle connector) to connect with a mating connector (e.g., a plug connector) such that the mated pair may be connected together properly, reliably, and safely in a blind mating operation, which may occur when the two connectors are to be connected together in a region of an electrical device where it may be difficult for a user to view the two connectors during mating. For an electrical connector that may be compact in size, the difficulty in performing a blind mating operation correctly may be amplified. However, although the electrical connector may be relatively small, a user may properly connect the electrical connector with the mating connector easily and reliably due to design features that make the electrical connector robust and user-friendly as well as compact. The robustness and ease of use of the electrical connectors according to various embodiments of the present invention may provide users with a level of assurance that routine mating operations will be unlikely to cause damage. For example, in some embodiments, features of the electrical connector may minimize or prevent misalignment and/or misorientation, and may enable users to easily ascertain that the electrical connector is properly aligned before a mating force is applied to seat the electrical connector and the mating connector in a mated position. In some embodiments, asymmetry in one or more structural components of an electrical connector may enable a user to determine easily whether the connector is not oriented properly relative to a mating connector (e.g., facing backwards when the connector should be rotated 180° to face frontwards). For example, a position of a component (e.g., a post, a recess, etc.) may be asymmetrically located on a top side of a connector towards a front face of the connector, which may enable a user to feel the position of the component by touch and to manipulate the connector to a proper orientation for connecting to a mating connector by touch. In another example, a pair of components (e.g., first and second holes) may be asymmetrically located with respect to, e.g., edges of a connector, where one component is located relatively closer to a first edge of the connector, and where the other component is located relatively farther from an opposite edge of the connector. The relative closeness of the component near the first edge of the connector may be readily seen by a user and used to determine, e.g., which is the front side of the connector. This relative closeness also may be readily determined without the user seeing the connector, by the user feeling the asymmetrical positions of the pair of components relative to the edges of the connector. Such asymmetry may facilitate blind mating operations by enabling a user to determine proper orientation and/or proper alignment by touch.

The inventor has further recognized and appreciated that compact electrical connectors may be more likely to be damaged by some forces than other forces as a result of their miniaturized size. For example, in mating a plug connector with a receptacle connector, although it may be preferred to have a force be applied in a direction parallel to an axial direction of the receptacle connector, in practice, however, a user may not pay special attention to an angle at which the plug connector is oriented with respect to the receptacle connector, or the location of the receptacle connector may be such that user may not be able to see whether the angle at which the plug connector is oriented is aligned with the axial direction of the receptacle connector. Thus, the receptacle connector may be subjected to an applied external force that is not parallel to the axial direction of the receptacle connector. Such off-axis forces can impact the receptacle connector in ways that impact the integrity of signals passing through the receptacle connector. Off-axis forces, for example, may cause the receptacle connector to tilt. In some situations, an off-axis force may be sufficient to break solder joints connecting metal terminals of the receptacle connector to a PCB. In other scenarios, an off-axis force may deform the metal terminals, shift their positions, or otherwise alter their signal paths through the receptacle connector in ways that degrade the integrity of signals passing through the receptacle connector.

Damage may also result if a user attempts to press the plug connector into the receptacle connector with the wrong orientation or with the plug connector misaligned (e.g., laterally shifted) with respect to the receptacle connector. For example, when a user attempts to insert a misaligned plug connector, the receptacle connector may be subjected to a large force, such as 55 N or more. In addition to the potential damage to the solder connections of the metal terminals, discussed above, the force may be sufficient to deform or break one or more portions of an insulating body of the receptacle connector, including a portion bounding a receiving portion in which the plug connector is to be seated when properly mated with the receptacle connector. The receptacle connector may then cease to be able to hold the plug connector snugly and reliably, thus creating the possibility of intermittent disconnection between the plug and receptacle connectors. Consequently, the receptacle connector may lose its functionality and, in turn, normal operation of an electronic device employing the receptacle connector may cease.

The above-noted risks of damage are greater for compact connectors, such as those with metal terminals spaced, center to center, at 0.6 mm or less, such as connectors with a terminal spacing of 0.5 mm or less, or 0.4 mm or less, or 0.35 mm or less.

Some aspects of the present technology described herein may reduce or eliminate the possibility of improper orientation of a plug connector during a blind mating operation with a receptacle connector. Some aspects may reduce or eliminate the possibility of misalignment between the plug and receptacle connectors. Some aspects may minimize or eliminate the application of damaging forces during a blind mating operation.

In some embodiments of the present invention, a housing of a receptacle connector may have a recessed portion on only one of two sides of a housing, to receive a corresponding tab portion of a plug connector in only one orientation, and therefore to prevent backwards mating of the plug connector to the receptacle connector. Such a structure may facilitate situations where blind mating takes place, by letting a user know there is a misalignment before the user uses significant force to push the connectors together. For example, a user may not be able to see that the plug connector is facing backwards relative to the receptacle connector and may attempt to erroneously mate these connectors in a reverse or backwards orientation. The tab portion may project from the plug connector and may function to prevent a terminal board of the plug connector from being inserted in a mating groove of the receptacle connector if the plug connector is backwards. The tab portion also may enable a user to sense a front portion of the plug connector by using touch to feel the tab portion, when the tab portion cannot readily be seen.

Figure 1B:
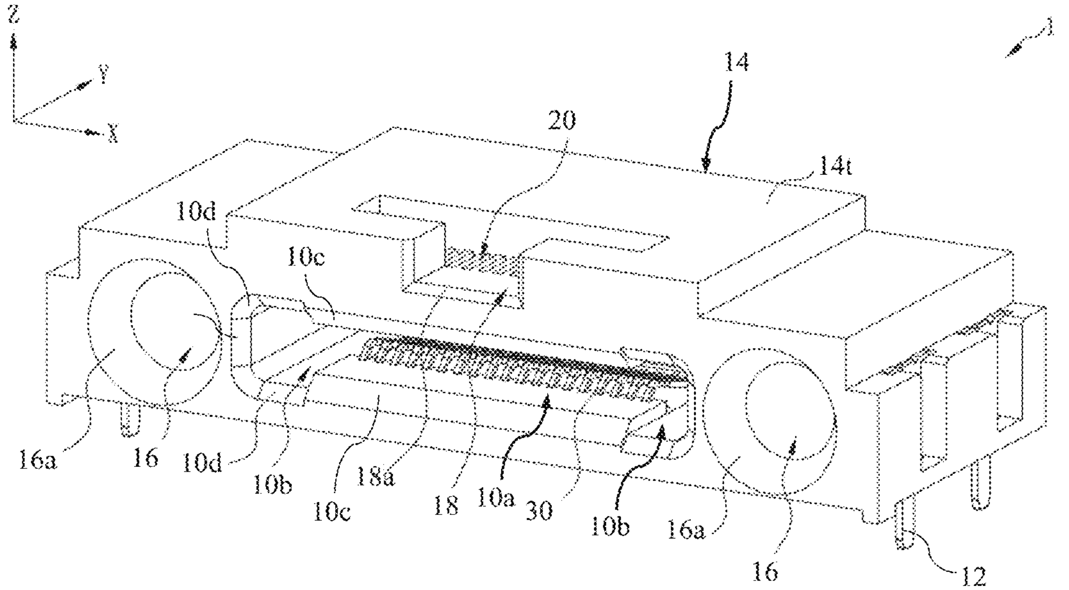
FIG. 1B shows another top front perspective view of the electrical connector of FIG. 1A, according to some embodiments of the present invention.

Turning now to the drawings, FIGS. 1A and 1B show a top front perspective view of an electrical connector 1, according to some embodiments of the present invention. In some embodiments, the electrical connector 1 may be a receptacle connector configured to mate with a plug connector 2 (see FIG. 8). In order to facilitate the discussion of various structures and/or components of the electrical connector 1, a "front" side of the electrical connector 1 in FIG. 1A is seen when viewed in the direction of the Y arrow, a "rear" side is seen when viewed in the opposite direction of the Y arrow, a "top" side is seen when viewed in the opposite direction of the Z arrow, a "bottom" side is seen when viewed in the direction of the Z arrow, a "left" side is seen when viewed in the direction of the X arrow, and a "right" side is seen when viewed in the direction opposite to the X arrow.

In some embodiments of the present invention, the electrical connector 1 may be a horizontal-type board-end connector, and may be structured to receive and electrically connect to a circuit board inserted horizontally into a mating groove 10 in an insertion or mating direction M, which may be along the Y direction. The circuit board may be, e.g., a terminal board. The electrical connector 1 may include mounting posts 12 extending in a Z direction (e.g., parallel to the Z arrow). The mounting posts 12 may be used to mount the electrical connector 1 onto a substrate (not shown). For example, the electrical connector 1 may be mounted on and electrically connected to a printed circuit board (PCB). In some other embodiments, instead of being a board-end connector, the electrical connector 1 may be a terminal connector, in which terminals of the electrical connector 1 respectively contact mating terminals of a mating connector, or may be another type of connector. In some other embodiments, instead of being a horizontal-type connector, the electrical connector may be a vertical-type connector or another type of connector, provided that one or more structures described herein that facilitate and/or enable blind mating are included.

In some embodiments of the present invention, the electrical connector 1 may be comprised of an insulative housing 14 and a terminal assembly 30 (see FIG. 5) disposed at least partially in the housing 14. A front side of the housing 14 may be comprised of the mating groove 10 located between guide holes 16 respectively positioned near left and right sides of the housing 14. Although FIG. 1A shows two guide holes 16, in some embodiments a different number of guide holes 16 may be located on the front side of the housing 14. In some embodiments, the mating groove 10 may include a through-hole that extends from the front side of the housing 14 through a rear side of the housing 14. In some embodiments, a guide groove 18 may extend from the front side and a top side of the housing 14. For example, the guide groove 18 may be a cut-out portion located at a corner formed of a front surface 14*f* and a top surface 14*t* of the housing 14. In some embodiments, the front surface 14*f* may be a mating surface of the electrical connector 1.

Figure 2A:
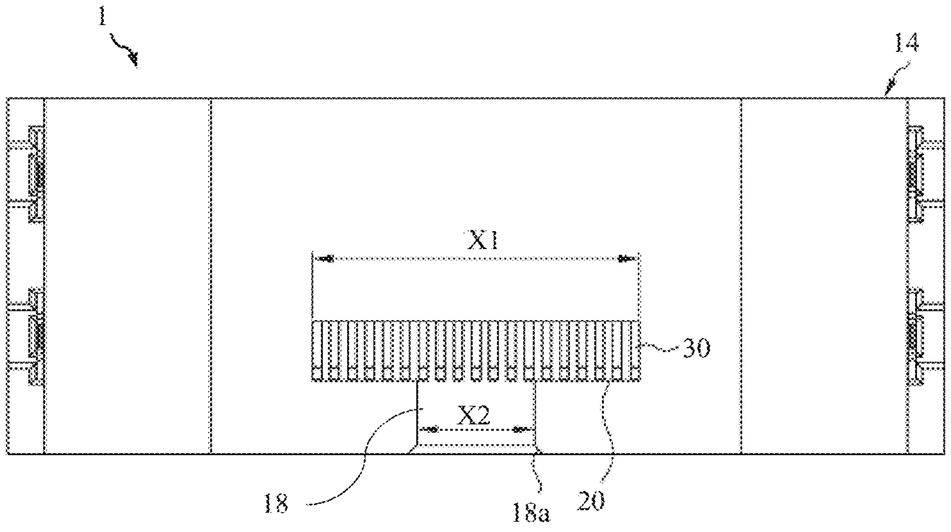
FIG. 2A shows a top view of the electrical connector of FIG. 1A, according to some embodiments of the present invention.

FIG. 2A shows a top view of the electrical connector 1, according to some embodiments of the present invention. In some embodiments, the housing 14 may be provided with a vent hole 20 extending from the top surface 14*t* of the housing 14 to the mating groove 10. In some embodiments, an end portion of the guide groove 18 may connect to the hole 20. The guide groove 18 may be recessed from the front surface 14*f* of the housing 14 and may be recessed from the top surface 14*t* of the housing 14, to form a ledge 14*a* in the housing 14. In some embodiments, the hole 20 be connected to the mating groove 10 such that a portion of the terminal assembly 30 may be seen through the hole 20. The hole 20 may serve as a heat conduit that enables heat generated by terminals 31 of the terminal assembly 30 to vent away from the terminal assembly 30 through the hole 20. In some embodiments, the hole 20 may prevent overheating of the electrical connector 1 by enabling heat to escape from the housing 14.

In some embodiments of the present invention, the guide groove 18 and the hole 20 may have a "T" shape when the housing 14 is viewed from a top perspective (e.g., as depicted in FIG. 2A). The hole 20 may have a width X1, and the guide groove 18 may have a width X2 smaller than X1. In some embodiments, an end portion 18*a* of the guide groove 18 may be flared, such that a width of the guide groove 18 on the front surface 14*t* of the housing 14 may be greater than the width X2. In some embodiments, the end portion 18*a* may be comprised of a plurality of facets or chamfers, as depicted in FIGS. 1A and 1B, which may facilitate insertion of an alignment protrusion of a mating connector into the guide groove 18, as discussed below. In some embodiments, the guide groove 18 and the hole 20 may not be connected together but may instead be separate portions of the housing 14. In some embodiments, the hole 20 may have a shape other than a rectangular shape.

Figure 2B:
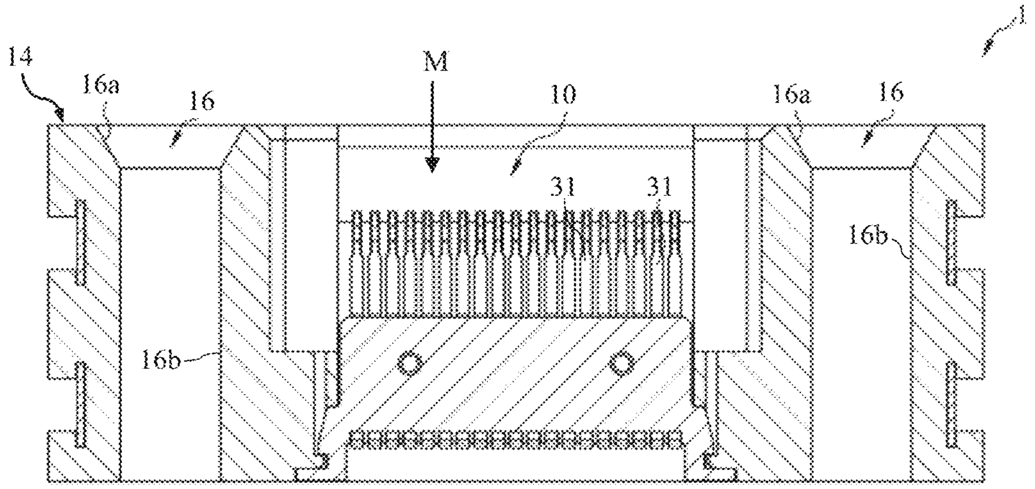
FIG. 2B shows a top view of a cross-section of the electrical connector of FIG. 1A, according to some embodiments of the present invention.

FIG. 2B shows a top view of a cross-section of the electrical connector 1 in an XY plane approximately midway through the mating groove 10 and the guide holes 16, according to some embodiments of the present invention. In some embodiments, the mating groove 10 may include a through-hole that extends from the front surface 14*f* of the housing 14 through a rear surface 14*r* of the housing 14. In some embodiments, each guide hole 16 may be comprised of an end portion 16*a* connected to an interior longitudinal portion 16*b*, with the end portion 16*a* being flared such that a diameter of the guide hole 16 at the front surface 14*f* of the housing 14 may be greater than a diameter of the end portion 16*a* adjacent the longitudinal portion 16*b*, which may facilitate insertion of an alignment post of a mating connector into the guide hole 16, as discussed below. For example, the end portion 16*a* may be comprised of an inclined wall having a frustoconical shape, and the longitudinal portion may be comprised of a straight wall having a cylindrical shape, as depicted in FIG. 2B. The relatively larger diameter of the frustoconical end portion 16*a* may taper to meet the relatively smaller diameter of the longitudinal portion 16*b*. In some embodiments, each guide hole 16 may have a central axis L along a Y direction parallel to the Y arrow, and may extend from the front surface 14*f* of the housing 14 to the rear surface 14*r* of the housing 14, as depicted in FIG. 2B. In some other embodiments, one or more of the guide holes 16 may be a blind hole that is not open at the rear surface of the housing 14. Although the longitudinal portion 16*b* of the guide hole 16 is depicted to be cylindrical, in some embodiments the longitudinal portion 16*b* may have a non-cylindrical shape.

Figure 3:
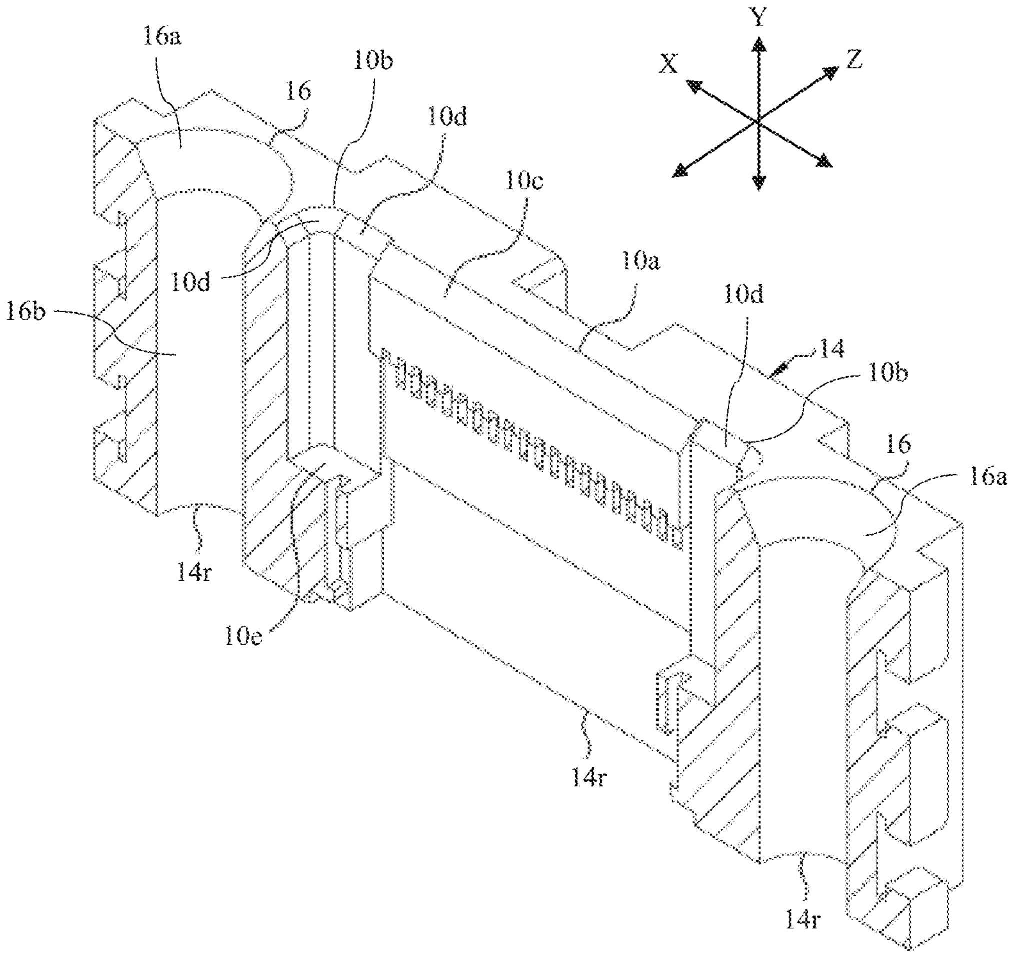
FIG. 3 shows a front perspective view of a cross-section of a housing of the electrical connector of FIG. 1A, according to some embodiments of the present invention.

FIG. 3 shows a front perspective view of a cross-section of the housing 14 in an XY plane approximately midway through the mating groove 10 and the guide holes 16, according to some embodiments of the present invention. In some embodiments, the mating groove 10 may be elongated in the X direction and may be comprised of a central portion 10*a* positioned between end portions 10*b*. In some embodiments, the terminals 31 of the terminal assembly 30 may be positioned within the central portion 10*a* of the mating groove 10, as depicted in FIG. 2B. In some other embodiments, a portion of the terminal assembly 30 may be located in some or all of the end portions 10*b* of the mating groove 10 (not shown). For example, one or more terminals 31 may be located in some or all of the end portions 10*b*. In some alternative embodiments, the central portion 10*b* and the end portions 10*a* may be disconnected from each other, at least at the front surface 14*f* of the housing 14. For example, in one such alternative embodiment, the central portion 10*b* may have an opening at the front surface 14*f* of the housing 14 and configured to receive a circuit board of a mating connector, and the end portions 10*b* may each have an opening at the front surface 14*f* of the housing 14 separate from the opening of the central portion 10*a*. Such an alternative structure may be used in cases where the circuit board of the mating connector is supported by nearby support structures, which are configured to be received in the end portions 10*b* but which need not be attached to opposite corners of the circuit board at an insertion edge of the circuit board.

In some embodiments of the present invention, top and bottom surface edges of the central portion 10*a* of the mating groove 10 may each have an inclined wall 10*c* (e.g., a chamfer, a facet), such that a height of the central portion 10*a* in the Z direction at the front surface 14*f* of the housing 14 is greater than a height of the central portion 10*a* at an interior portion of the central portion 10*a* of the mating groove 10. As depicted in FIG. 1B, the inclined walls 10*c* may have opposite inclination angles from each other (e.g., +a and −a). In some embodiments, the inclined walls 10*c* may facilitate an initial positioning or alignment of a circuit board of a mating connector in the central portion 10*a* of the mating groove 10 before a mating force is applied to mate the mating connector with the electrical connector 1.

In some embodiments of the present invention, each of the end portions 10*b* of the mating groove 10 may have a generally square or rectangular cross section and may have a curved shape at an outer perimeter portion, which may have an arch-like appearance in a front view of the electrical connector 1. In some embodiments, the generally square or rectangular cross section may have rounded corners, as depicted in FIGS. 1B and 3. In some embodiments, the curved shape of each end portion 10*b* may be comprised of a plurality of inclined walls 10*d* (e.g., chamfers, facets, curved flares) and a plurality of rounded corners, or may be comprised of a single curved wall that flares outward from an interior portion to the front surface 14*f* of the housing 14. In some embodiments, the end portions 10*b* may enable support structures of a mating connector to be easily aligned in the end portions 10*b* of the mating groove 10 before a mating force is applied to mate the mating connector with the electrical connector 1. For example, the support structures may be ribs supporting lateral edges of a circuit board of the mating connector. An advantageous aspect of having the end portions 10*b* be contiguous with the central portion 10*a* of the mating groove is that it enables a more compact design of the electrical connector 1 as well as a more compact design of the mating connector. That is, less space on the first surface 14*f* of the housing 14 would be needed to accommodate the circuit board of the mating connector and the support structures of the mating connector, because such mating-connector structures would be contiguous with each other and therefore more compact, and as a result would not need, e.g., surface pacers to be provided at the front surface 14*f* to separate individual recesses or holes in the housing 14. In some embodiments, the central portion 10*a* of the mating groove 10 and at least one of the end portions 10*b* of the mating groove 10 may have different depths, such that at least one ledge 10*e* is present in the mating groove 10, as depicted in FIG. 3. For example, the depth of the end portions 10*b* from the front surface 14*f* of the housing 14 may be less than a depth of the central portion 10*a* from the front surface 14*f* of the housing 14. In some embodiments, the central portion 10*a* may be comprised of a through-hole that ends from the front surface 14*f* to the rear surface 14*r* of the housing 14.

Figure 4:
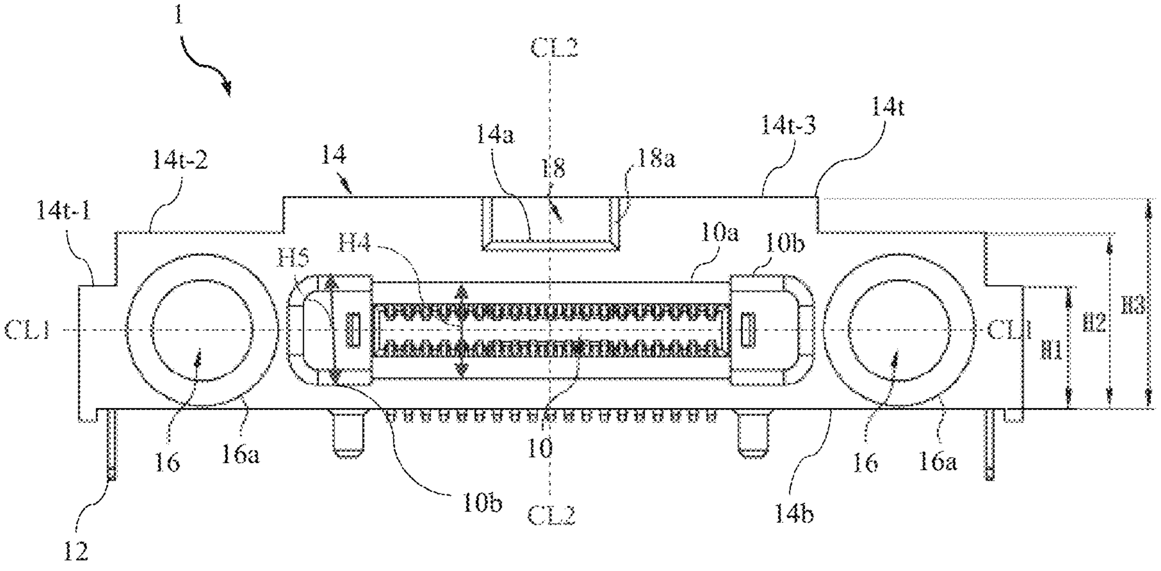
FIG. 4 shows an elevational front view of the electrical connector of FIG. 1A, according to some embodiments of the present invention.

FIG. 4 shows an elevational front view of the electrical connector 1, according to some embodiments of the present invention. In some embodiments, the top surface 14*t* of the housing 14 may have a plurality of different heights relative to a bottom surface 14*b* of the housing 14. In some embodiments, the top surface 14*t* may be comprised of left and right first top portions 14*t*-1 each having a height H1. In some embodiments, the top surface 14*t* may be comprised of a central top portion 14*t*-3 having a height H3 different from H1. Although H3 is shown to be greater than H1 in FIG. 4, in some embodiments H3 may be less than H1. In some embodiments, between the central top portion 14*t*-3 and each of the left and right first top portions 14*t*-1 may be a second top portion 14*t*-2 having a height H2 different from H1 and different from H3 (i.e., H3≠H2≠H1). In some embodiments, H2 may be greater than H1 and less than H3 (i.e., H3>H2>H1) such that the top surface 14*a* may be stepped, as shown in FIG. 4. In some other embodiments, H2 may be less than H1 and greater than H3 (i.e., H1>H2>H3). In some other embodiments, H3 may be the same as H1 but different from H2 (i.e., H3=H1; H3, H1≠H2). In some embodiments, the top surface 14*t* may have more than three different heights.

In some embodiments of the present invention, the ledge 14*a* forming a portion of the guide groove 18 may have a height between H3 and H1. In some embodiments, the height of the ledge 14*a* may be between H2 and H1. In some embodiments, the guide holes 16 may be positioned below the second top portions 14*t*-2 of the top surface 14*t* of the housing 14, and each guide hole 16 may have a diameter that is less than H2. In some embodiments, the diameter of each guide hole 16 may be greater than H1 and less than H2.

According to some embodiments of the present invention, a maximum height H4 of the central portion 10*a* of the mating groove 10 may be less than a maximum height H5 of each of the end portions 10*b* of the mating groove 10. Such a height difference may enable a relatively thinner circuit board of a mating connector to be provided with relatively thicker support structures, with the thicker support structures being accommodated in the end portions 10*b* of the mating groove 10 when the mating connector is mated with the electrical connector 1.

According to some embodiments of the present invention, a center of each of the guide holes 16, a center of each of the end portions 10*b* of the mating groove 10, and a center of the central portion 10*a* may be aligned along a common first line extending parallel to the X direction. In some embodiments, the common first line may be a first centerline CL1, as shown in FIG. 4. In some embodiments, a center of the guide groove 18 and a center of the mating groove 10 may be aligned along a common second line extending parallel to the Z direction. In some embodiments, the common second line may be a second centerline CL2, as shown in FIG. 4.

Figure 5:
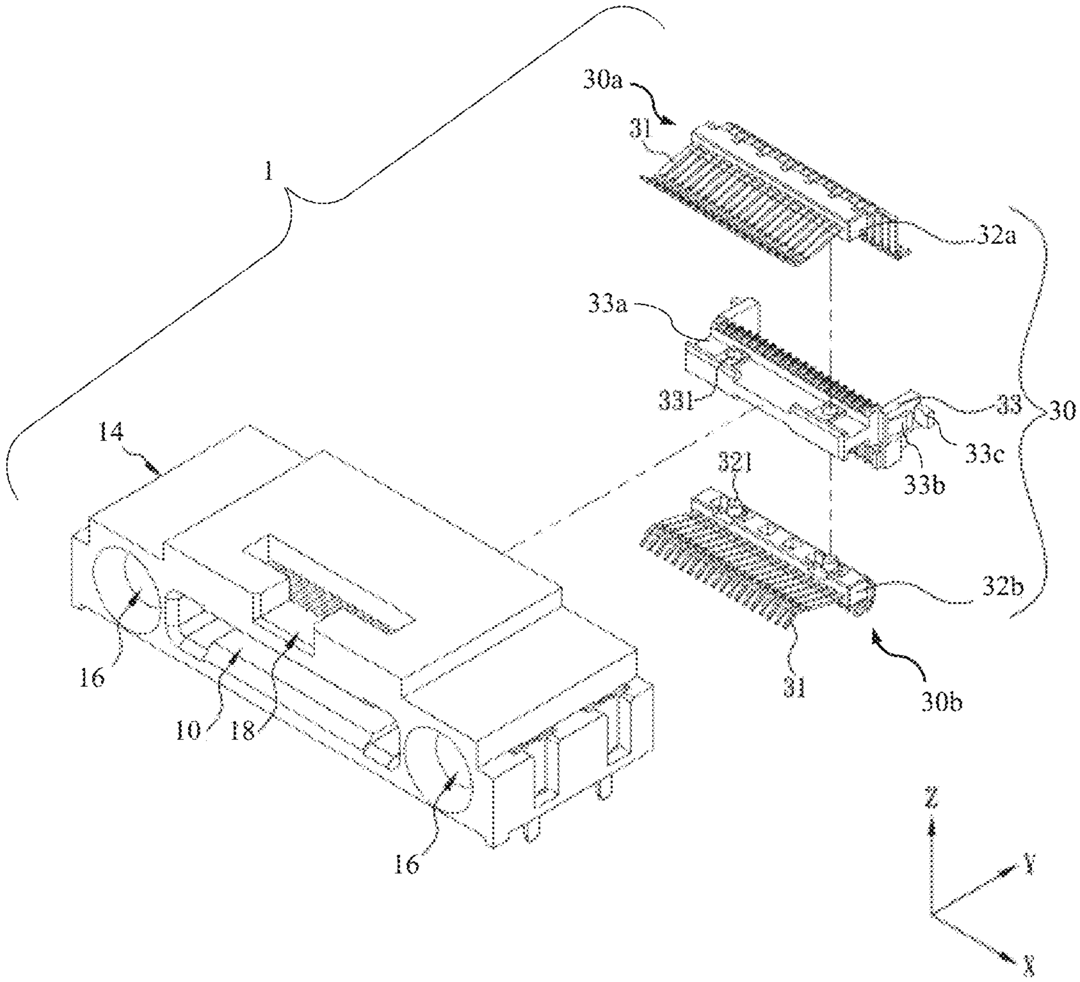
FIG. 5 shows the electrical connector of FIG. 1A in a partially disassembled state, according to some embodiments of the present invention.

FIG. 5 depicts the electrical connector 1 in a partially disassembled state, to show additional details about the terminal assembly 30, according to some embodiments of the present invention. In some embodiments, the terminal assembly 30 may be comprised of a plurality of metal terminals 31 disposed in the housing 14. The terminals 31 may be arranged in the mating groove 10 such that, when a mating section (e.g., a circuit board) of a mating connector is inserted in the mating groove 10 to mate with the electrical connector 1, contact surfaces of the terminals 31 are in electrical contact with one or more corresponding contact surfaces of the mating section of the mating connector. As noted above, a portion of the terminals 31 may be exposed to an environment external to the housing 14 through the hole 20 in the top surface 14*t* of the housing 14. In some embodiments, the hole 20 may reduce heat build-up in the housing 14, by serving as a conduit for heat dissipation. For example, if the electrical connector 1 is used in high-speed signal transmissions or in power transmissions, heat generated at the terminals 31 may quickly dissipate to outside of the housing 14 via the hole 20.

In some embodiments of the present invention, the terminal assembly 30 may be comprised of a first terminal subassembly 30*a*, a second terminal subassembly 30*b*, and a fixing base 33 in contact with the first and second terminal subassemblies 30*a*, 30*b*. For example, the fixing base 33 may be sandwiched between the first and second terminal subassemblies 30*a*, 30*b*. The first terminal subassembly 30*a* may be comprised of a plurality of terminals 31 attached to an insulative first terminal base 32*a*. Similarly, the second terminal subassembly 30*b* may be comprised of a plurality of terminals 31 attached to an insulative second terminal base 32*b*. In some embodiments, the first and second terminal bases 32*a*, 32*b* may be formed of plastic, and the terminals 31 may be lodged in the plastic. For example, plastic forming the first terminal base 32*a* may be molded around a row of terminals 31 to form the first terminal subassembly 30*a* and, similarly, plastic forming the second terminal base 32*b* may be molded around a row of terminals 31 to form the second terminal subassembly 30*b*. In another example, the terminals 31 may be mounted on the first and second terminal bases 32*a*, 32*b* without being molded in the first and second terminal bases 32*a*, 32*b*.

In some embodiments of the present invention, the fixing base 33 may be comprised of a plurality of fixing-base seating portions 331 configured to seat with one or more terminal-base seating portions 321 on each of the first and second terminal bases 32*a*, 32*b*, to enable the first terminal subassembly 30*a*, the second terminal subassembly 30*b*, and the fixing base 33 to have a set position relative to each other when the terminal assembly 30 is fully assembled. In some embodiments, the fixing base 33 may be physically attached or fixed to the first and second terminal subassemblies 30*a*, 30*b*. In some other embodiments, the fixing base 33 may set the relative positions of the first and second terminal subassemblies 30*a*, 30*b* via the seating portions 331, 321 without being fixedly attached to the first and second terminal subassemblies 30*a*, 30*b*.

Figure 6:
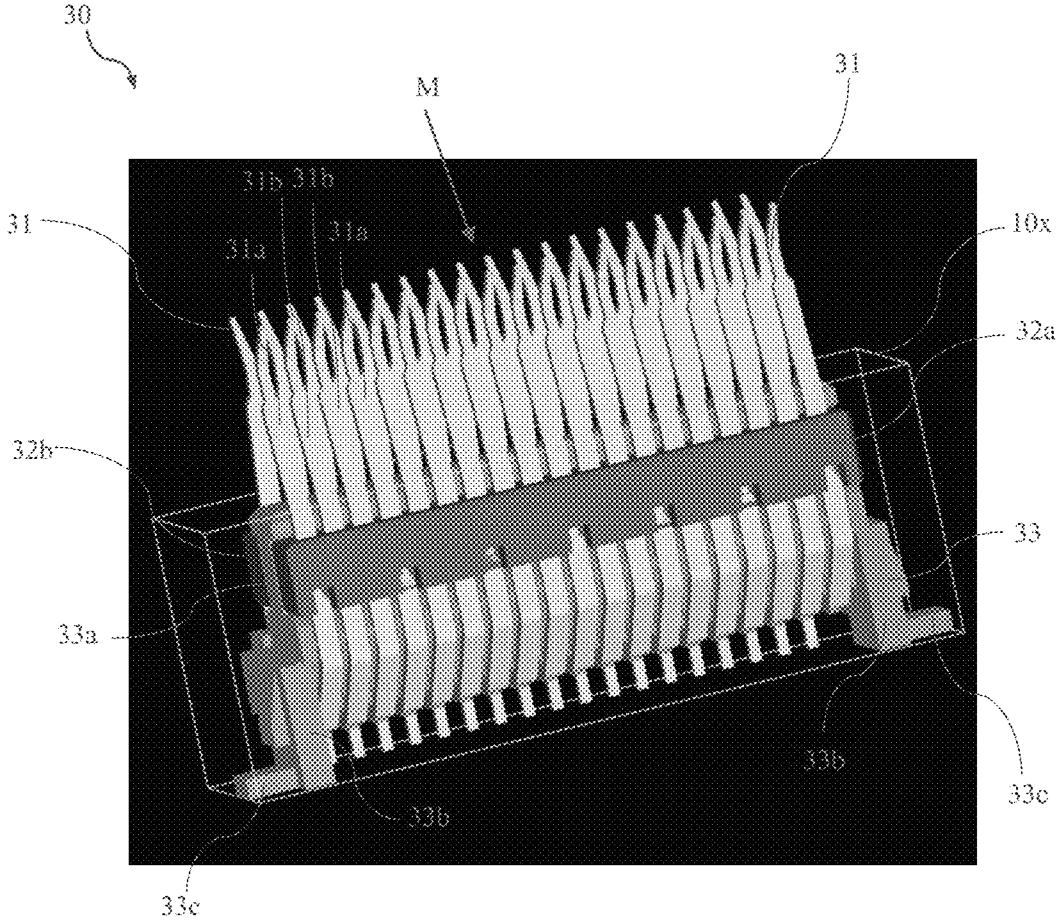
FIG. 6 shows a perspective view of a terminal assembly, according to some embodiments of the present invention.

FIG. 6 shows a perspective view of the terminal assembly 30, according to some embodiments of the present invention. In FIG. 6, a portion of the mating groove 10 is schematically represented by a rectangular box 10*x* to provide an example of how the terminal assembly 30 may be disposed in the mating groove 10, in some embodiments. The fixing base 33 may be comprised of a main section 33*a* configured to be sandwiched between the first and second terminal subassemblies 30*a*, 30*b*. The fixing-base seating portions 331 (see FIG. 5) may be located at top and bottom surfaces of the main section 33*a*. In some embodiments, at least two legs 33*b* may extend from the main section 33*a*. For example, a pair of legs may extend respectively from opposite ends of the main section 33*a*. In some embodiments, at least a portion of each of the legs 33*b* may be disposed outside of a region sandwiched by the first and second terminal subassemblies 30*a*, 30*b*. For example, the fixing base 33 may be comprised of two legs 33*b* extending rearward (e.g., in the direction of the Y arrow in FIG. 5). In some embodiments, each of the legs 33*b* may be configured to attach to an internal surface of the housing 14 (e.g., within the mating groove 10) via a foot 33*c* that extends at an angle from the leg 33*b*. For example, the foot 33*c* may extend perpendicularly from a longitudinal direction of the leg 33*b* and may be used to secure the terminal assembly 30 to the housing 14.

In some embodiments of the present invention, the housing 14 may include the fixing base 33. For example, the fixing base 33 may be formed of plastic and may be formed integrally with the housing 14 or may be fixedly attached to the housing 14. In some embodiments, the terminal assembly 30 may be assembled by sliding the first and second terminal subassemblies 30*a*, 30*b* into a rear opening (not shown) of the housing 14 on opposite sides of the main section 33*a*, such that the seating portions 331, 321 seat together and are pressed-fit to be immovable in the housing 14. Optionally, the first and second terminal bases 32*a*, 32*b* may be comprised of latches (not shown) configured to latch to internal surfaces of the housing 14 when the first and second terminal subassemblies 30*a*, 30*b* are seated properly with respect to the fixing base 33.

According to some embodiments of the present invention, the terminals 31 may be comprised of ground terminals 31*a* and signal terminals 31*b*. In some embodiments, a pair of signal terminals 31*b* may be positioned between consecutive ground terminal 31*a*, as shown in FIG. 6. In some embodiments, each of the first and second terminal bases 32*a*, 32*b* may include a plurality of protrusions extending laterally from a longitudinal bar. Each ground terminal 31*a* may be lodged in or attached to a corresponding one of the protrusions of the first and second terminal bases 32*a*, 32*b*. For example, each protrusion may be configured to cover a portion of a corresponding ground terminal 31*a*. An example of the protrusions is discussed below in connection with FIG. 7D.

Figure 7A:
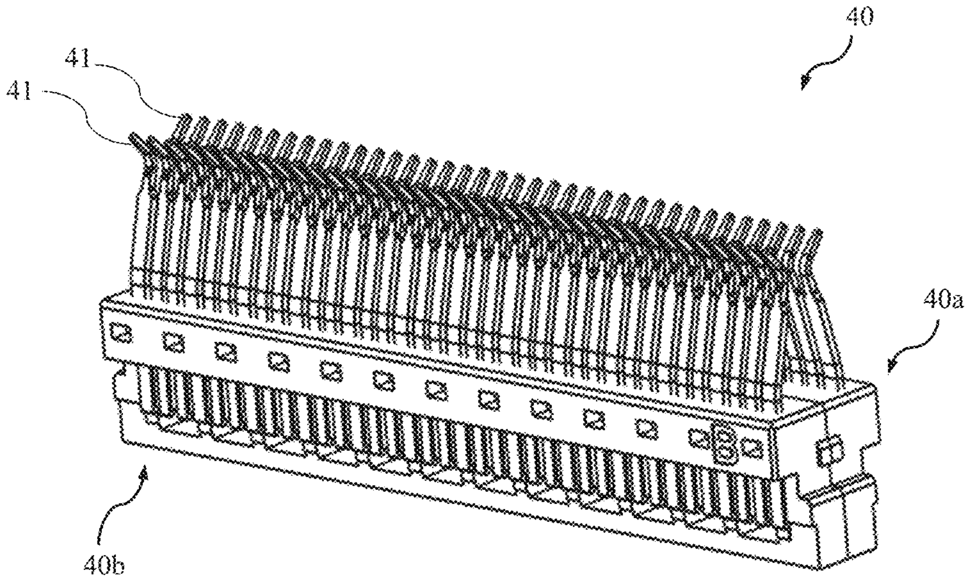
FIG. 7A shows a perspective view of another terminal assembly 40, according to some embodiments of the present invention.
Figure 7B:
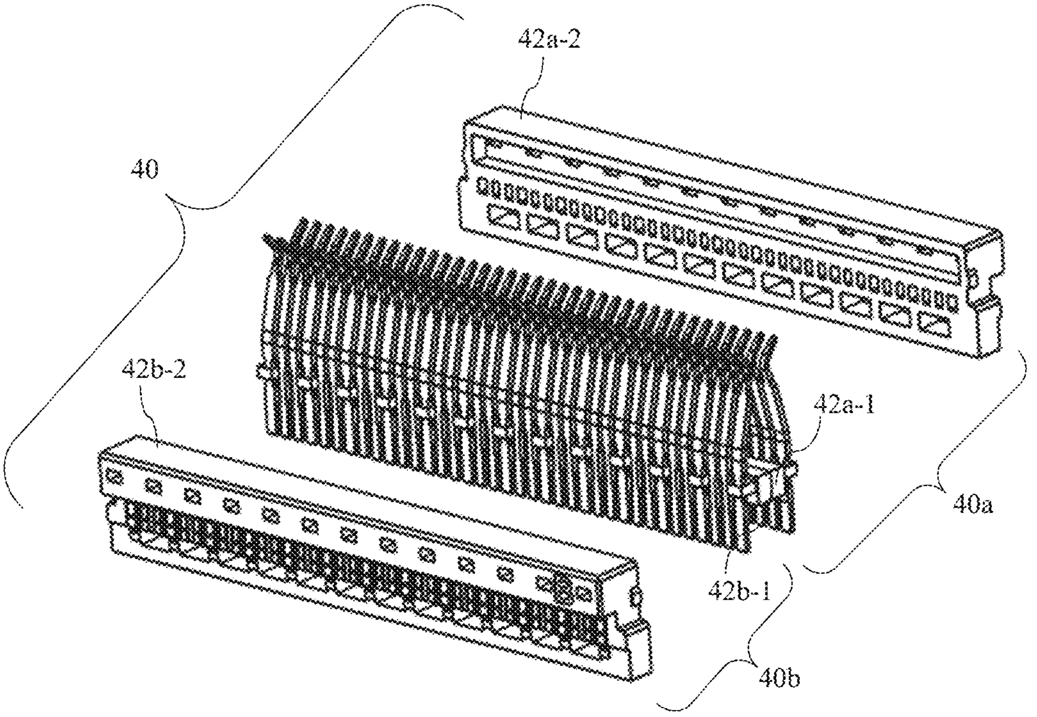
FIG. 7B shows a perspective view of the terminal assembly of FIG. 7A in a partially disassembled state, according to some embodiments of the present invention.

Instead of the terminal assembly 30, the electrical connector 1 may be comprised of a terminal assembly 40 that does not include a central connector such as the fixing base 33. FIG. 7A shows a perspective view of the terminal assembly 40, according to some embodiments of the present invention. FIG. 7B shows a perspective view of the terminal assembly 40 in a partially disassembled state. In some embodiments, the terminal assembly 40 may be comprised of first and second terminal subassemblies 40*a*, 40*b* that are in direct contact with each other without a structure in between. For example, the first terminal subassembly 40*a* may be comprised of a row of metal terminals 41 positioned between an insulative inner terminal base 42*a*-1 and an insulative outer terminal base 42*a*-2. In some embodiments, the outer terminal base 42*a*-2 may be formed of plastic and may be fixedly attached to some or all of its terminals 41. For example, the outer terminal base 42*a*-2 may be molded around a portion of some or all of its terminals 41. In some embodiments, the inner terminal base 42*a*-1 may be fixedly attached to some of its terminals 41. For example, the inner terminal base 42*a*-1 may be molded around a portion of each of its ground terminals 41*a*. Similarly, the second terminal subassembly 40*b* may be comprised of a row of metal terminals 41 positioned between an insulative inner terminal base 42*b*-1 and an insulative outer terminal base 42*b*-2. In some embodiments, the outer terminal base 42*b*-2 may be formed of plastic and may be fixedly attached to some or all of its terminals 41. For example, the outer terminal base 42*b*-2 may be molded around a portion of some or all of its terminals 41. In some embodiments, the inner terminal base 42*b*-1 may be fixedly attached to some of its terminals 41. For example, the inner terminal base 42*b*-1 may be molded around a portion of each of its ground terminals 41*a*. The terminals 41 may be comprised of ground terminals 41*a* and signal terminals 41*b*. In some embodiments, each row of terminals may be comprised of a pair of signal terminals 41*b* positioned between consecutive ground terminal 41*a*, as shown in FIG. 7C.

Figure 7C:
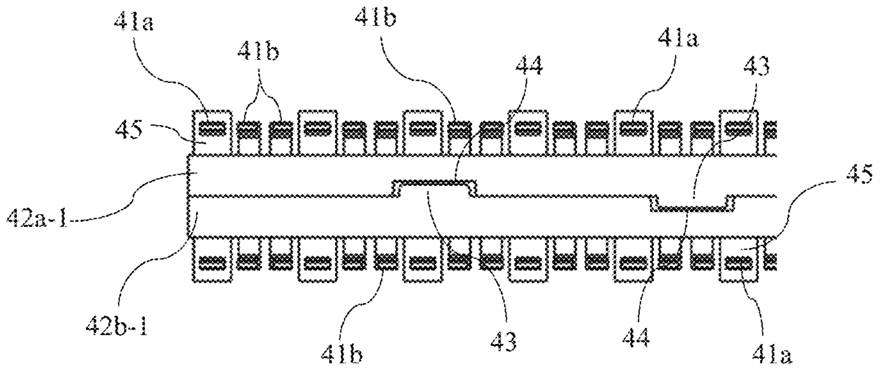
FIG. 7C shows a bottom plan view of a portion of the terminal assembly of FIG. 7A, according to some embodiments of the present invention.
Figure 7D:
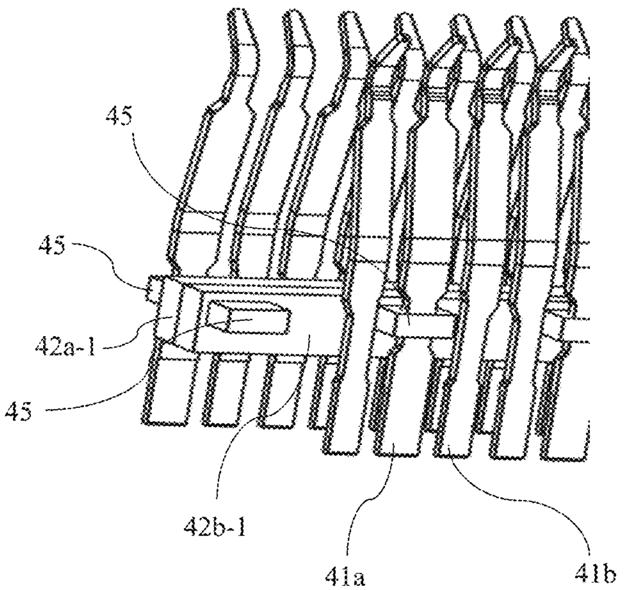
FIG. 7D shows a perspective view of a portion of the terminal assembly of FIG. 7A, according to some embodiments of the present invention.

FIG. 7C shows a bottom plan view of a portion of the inner terminal base 42*a*-1 of the first terminal subassembly 40*a* assembled together with a portion of the inner terminal base 42*b*-1 of the second terminal subassembly 40*b*, according to some embodiments of the present invention. Each of the inner terminal bases 42*a*-1, 42*b*-1 may be comprised of one or more protruding bumps 43 and one or more recesses 44. The bumps 43 of the inner terminal base 42*a*-1 may be configured to engage with and seat snugly in the recesses 44 of the inner terminal base 42*b*-1. Similarly, the bumps 43 of the inner terminal base 42*b*-1 may be configured to engage with and seat snugly in the recesses 44 of the inner terminal base 42*a*-1. FIG. 7D shows a perspective view of a portion of the inner terminal base 42*a*-1 and the inner terminal base 42*b*-1 joined together, with some of the terminals 41 removed to show additional structural details, according to some embodiments. A plurality of protrusions 45 may extend laterally from each of the inner terminal bases 42*a*-1, 42*b*-1, with each protrusion 45 being configured to hold a ground terminal 41*a*. For example, each protrusion 45 may be molded around or fixed to a corresponding one of the ground terminals 41*a*, to cover a portion of the corresponding ground terminal 41*a*.

Returning to FIG. 5, although a single mating groove 10 is shown for the electrical connector 1, in some embodiments of the present invention more than one mating groove 10 may be included in an electrical connector. Similarly, although two guide holes 16 are shown, one each on opposite sides of the housing 14 with the mating groove 10 in between, a different number of guide holes 16 (e.g., one or more than two) may be included in an electrical connector and/or the relative position of each guide hole 16 with respect to the mating groove 10 may be different from the embodiment shown in FIG. 5. For example, a pair of guide holes 16 may be positioned at diagonally opposite corner regions of the housing 14 and/or a different number of guide holes may be positioned on the left side of the housing 14 than on the right side of the housing 14. Similarly, although a single guide groove 18 is shown in FIG. 5 to be centrally positioned above (i.e., toward a top side) of the mating groove 10, the relative positions of these structures may be different and/or more than one guide groove 18 may be included in an electrical connector.

Figure 8:
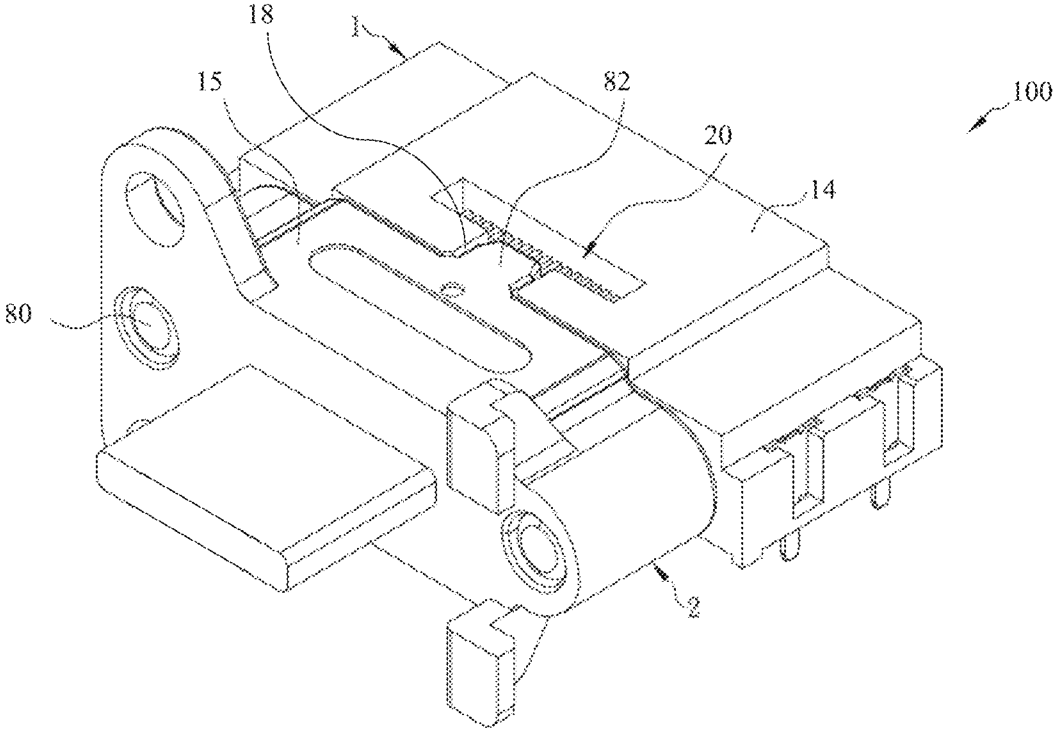
FIG. 8 shows a perspective view of a mated pair electrical connectors, according to some embodiments of the present invention.
Figure 9:
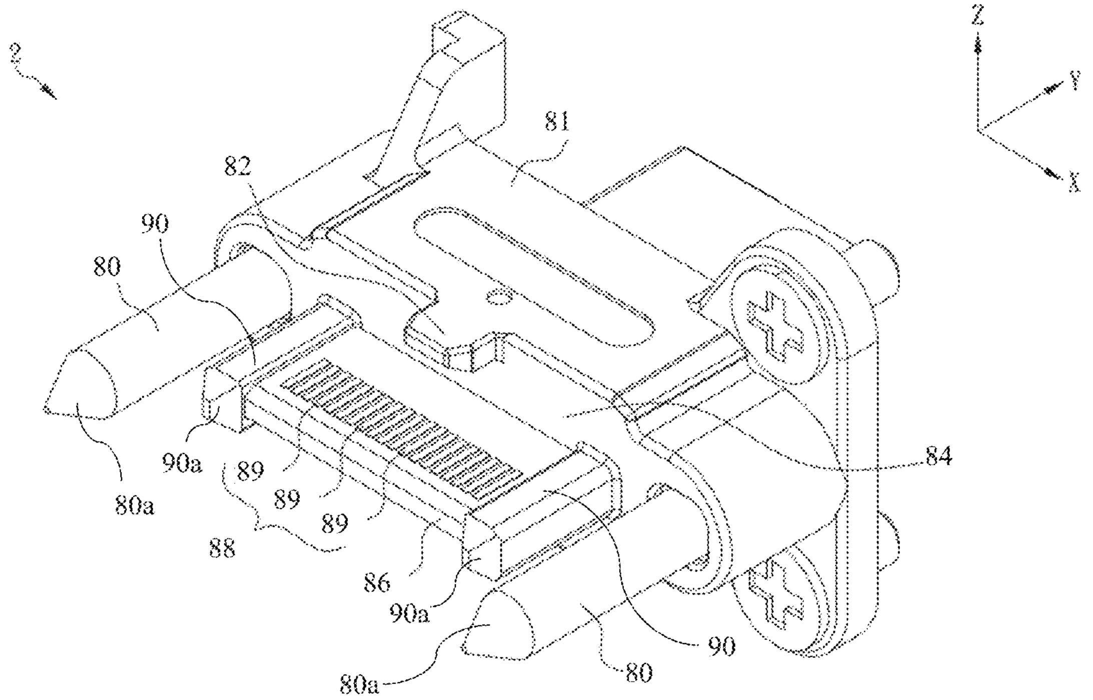
FIG. 9 shows a perspective view of a mating connector useable with the electrical connector of FIG. 1A, according to some embodiments of the present invention.
Figure 11A:
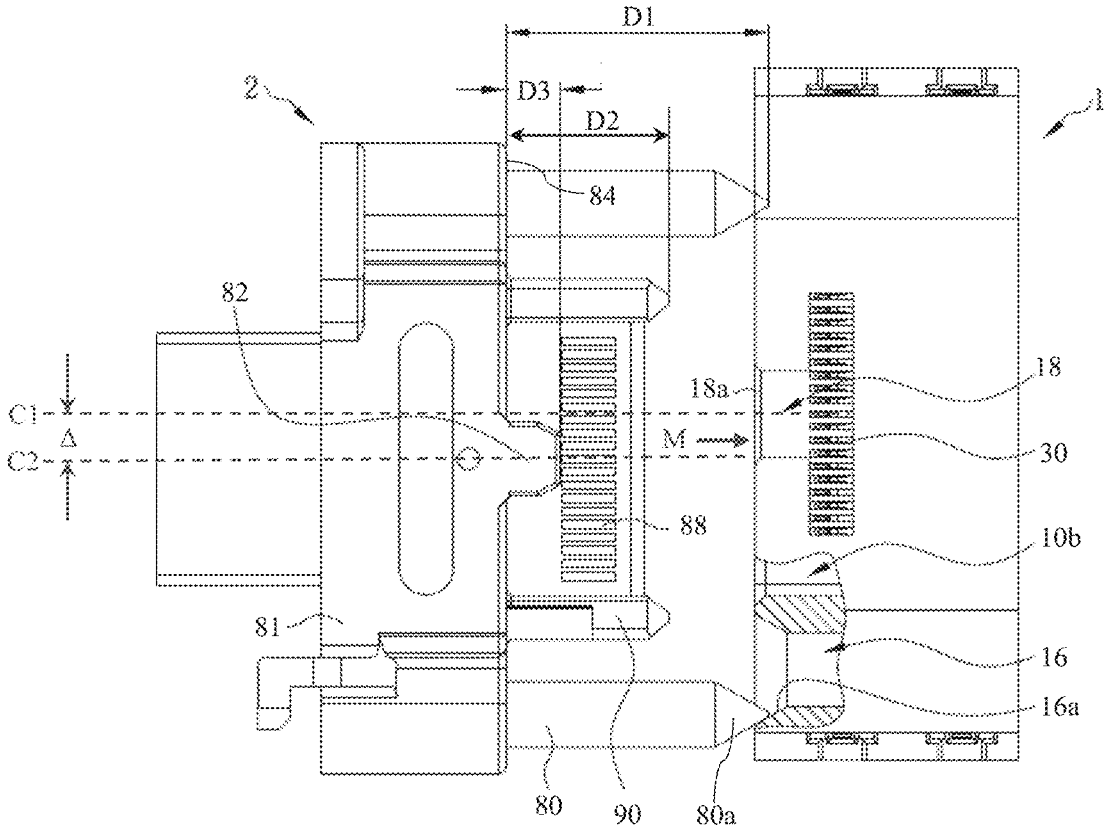
FIG. 11A shows a top plan view of a receptacle connector and a plug connector in an initial phase of a mating operation, according to some embodiments of the present invention.

FIG. 8 shows a perspective view of a mated pair 100 of connectors comprised of the electrical connector 1, which may be a receptacle connector 1, mated with a mating connector 2, which may be a plug connector 2, according to some embodiments of the present invention. FIG. 9 shows a perspective view of an interface side of the plug connector 2, which is configured to come into contact with the receptacle connector 1. The plug connector 2 may be comprised of a housing 81, a circuit board 86 extending from a surface 84 of the housing 81, mating protrusions 80 extending from the surface 84 of the housing, and support ribs 90 positioned on opposite edges of the circuit board 86. In some embodiments, the mating protrusions 80 may be formed of metal and may extend through through-holes of the housing 81 and may be configured to be disposed in the guide holes 16 of the receptacle connector 1 when the connectors 1, 2 are mated together. In some embodiments, the housing 81 may be comprised of an alignment tab 82 configured to be inserted in the guide groove 18 of the receptacle connector 1, as depicted in FIG. 8. The alignment tab 82 may located at or near a top side of the housing 81 and may enable a user to determine a top side of the plug connector 2 by using touch to feel the alignment tab 82 when it is not possible to see the alignment tab 82 (e.g., in a blind mating operation). In some embodiments, each mating protrusion 80 may have a tapered end 80*a*. For example, the tapered end 80*a* may have a conical shape, as depicted in FIG. 9. In some embodiments, a taper angle of the tapered end 80*a* may match an inclination angle of the inclined wall of the end portion 16*a* of the guide hole 16. Such matching of angles may facilitate initial positioning of the mating protrusions 80 of the plug connector 2 in the guide holes 16" of the receptacle connector 1. For example, the inclined wall of the end portion 16*a* may provide a sliding surface for a slightly misaligned tapered end 80*a* to slide into alignment with the guide hole 16. By accounting for and correcting slight misalignments, the receptacle connector 1 may be advantageously suited for blind mating operations where a user may not be able to observe whether there is proper alignment of the mating protrusions 80 with the guide holes 16 but instead may need to achieve alignment by touching various surfaces and sensing relative sliding movement of the connectors 1, 2. In some embodiments, as depicted in FIG. 11A, the tapered ends 80*a* of the mating protrusions 80 may have a conical shape and the inclined walls of the end portions 16*a* of the guide holes 16 may have a frustoconical shape such that a tolerable misalignment Δ between a centerline C1 of the guide groove 18 of the receptacle connector and a centerline C2 of the alignment tab 82 of the plug connector 2 may be corrected through gentle sliding action of the tapered ends 80*a* along the inclined walls of the end portions 16*a*. In some embodiments, the tolerable misalignment Δ in a range of approximately 1 mm to approximately 4 mm (e.g., 1.5 mm, 2.0 mm, 2.5 mm, 3.0 mm, 3.5 mm) may be corrected by such sliding action during a blind mating operation.

According to some embodiments of the present invention, the circuit board 86 of the plug connector 2 may be comprised of a contact array 88, as shown in FIG. 9. The contact array 88 may be comprised of a plurality of metal contacts 89 configured to be in contact with corresponding terminals 41 of the receptacle connector 1 when the connectors 1, 2 are mated together. In some embodiments, the support ribs 90 may be attached to left and right edges of the circuit board 86 and may prevent inadvertent flexing or bending of the circuit board 86. In some embodiments, each rib 90 may have a greater thickness in the Z direction than a thickness of the circuit board 86. For example, returning to FIG. 4, the relatively smaller thickness H4 of the central portion 10*a* of the mating groove 10 may be configured to accommodate the relatively lower thickness of the circuit board 86 such that the metal contacts 89 are in electrical contact with the terminals 31 of the receptacle connector 1, and the relatively greater thickness H5 of the end portions 10*b* of the mating groove 10 may be configured to accommodate the relatively greater thickness of the support ribs 90.

Figure 10:
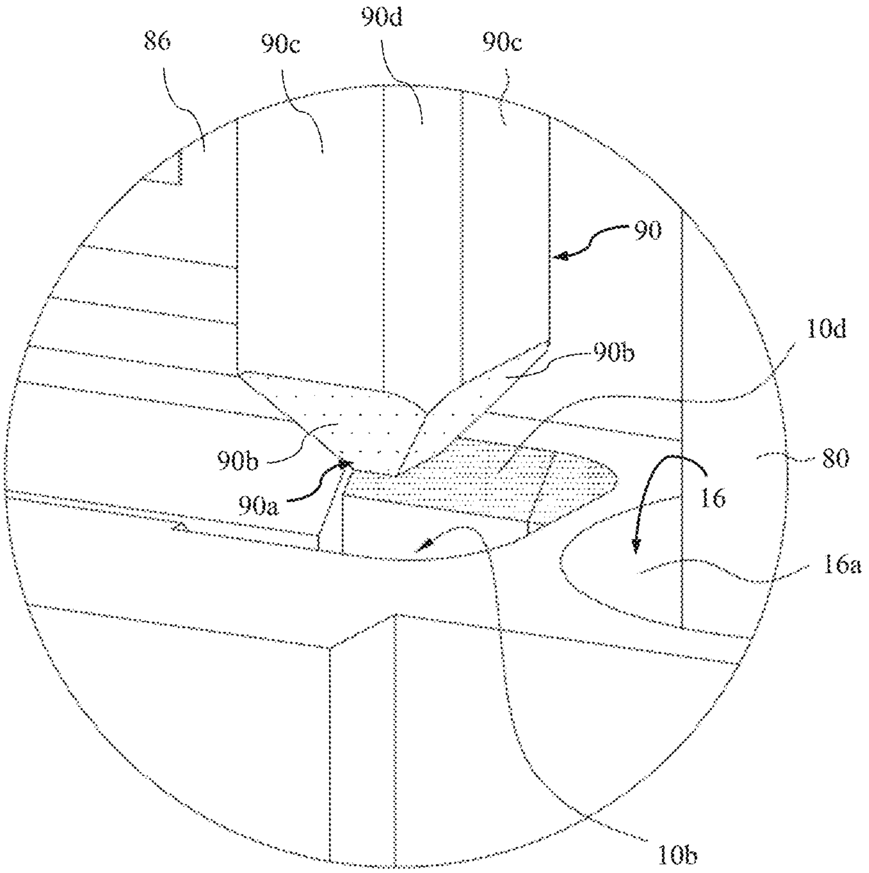
FIG. 10 shows a perspective view of a portion of the mating connector of FIG. 9 relative to a portion of the electrical connector of FIG. 1A, according to some embodiments of the present invention.

According to some embodiments of the present invention, an insertion end 90*a* of each support rib 90 may be comprised of a plurality of inclined walls 90*b* such that the insertion end 90*a* may have an pyramidal shape, as shown in the perspective view of FIG. 10. In some embodiments, each support rib 90 may be comprised of a plurality of longitudinal walls 90*c* walls extending from the insertion end 90*a*. In some embodiments, the circuit board 86 may be attached to each support rib 90 at one of the longitudinal walls 90*c* of the support rib 90, with the insertion end 90*a* of each support rib 90 extending away from an outer edge of the circuit board 86, as shown in FIG. 9. By having the insertion ends 90*a* of the support ribs 90 extending outwards from the outer edge of the circuit board 86, the circuit board 86 may be further protected from unnecessary force during initial alignment of the plug connector 2 during a blind mating operation. For example, as shown in FIG. 10, during a blind mating operation, the inclined walls 90*b* of each insertion end 90*a* of the plug connector 2 may encounter the inclined walls 10*d* of the end portions 10*b* of the mating groove 10 before the circuit board 86 of the receptacle connector 1 can be inserted in the central portion 10*a* of the mating groove 10. Therefore, misalignment of the plug connector 2 may be felt by a user by an inability to insert the insertion ends 90*a* in the end portions 10*b*, without the terminals of the receptacle connector 1 or the metal contacts 89 of the circuit board 86 being damaged through inadvertent scraping or bending if force is erroneous applied while the connectors 1, 2 are misaligned. In some embodiments, the inclined walls 90*b* of the support ribs 90 may be inclined at angles that correspond to inclination angles of the inclined walls 10*d* of the end portions 10*b* of the mating groove 10, such that the inclined walls 90*b* of the support ribs may slide along the inclined walls 10*d* of the end portion 10*b* to center the support ribs 90 in the end portions 10*b*, should there be a slight misalignment during a blind mating operation. Optionally, in some embodiments, adjacent inclined walls 10*d* may be separated by a chamfer 90*d*.

Figure 11B:
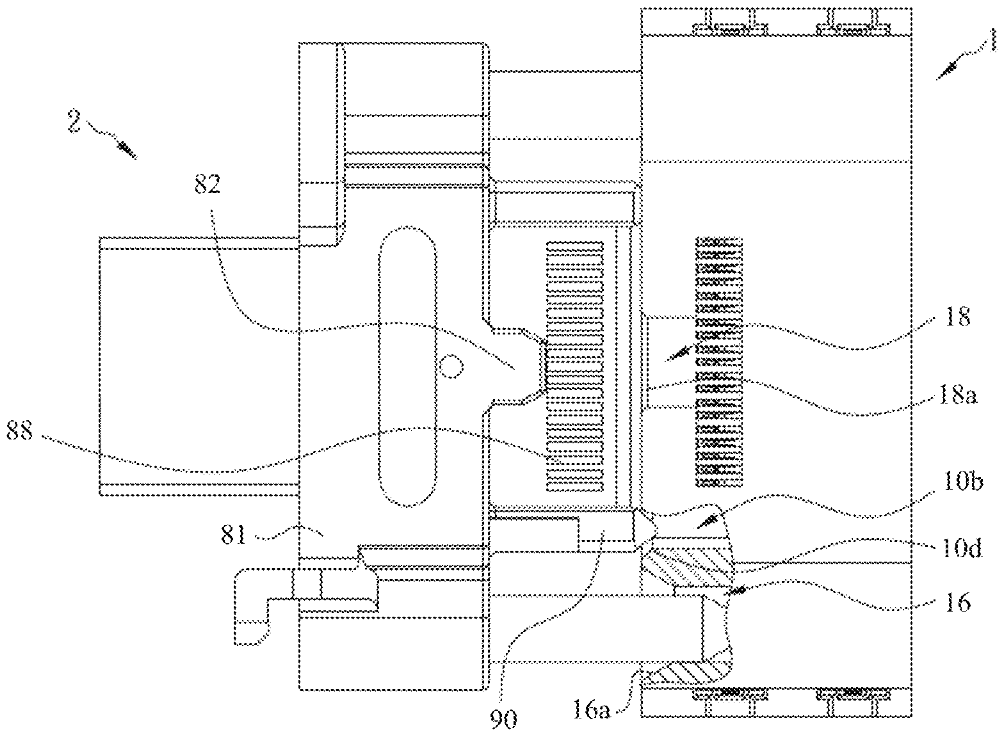
FIG. 11B shows the connectors of FIG. 11A in an intermediate phase of the mating operation, according to some embodiments of the present invention.
Figure 11C:
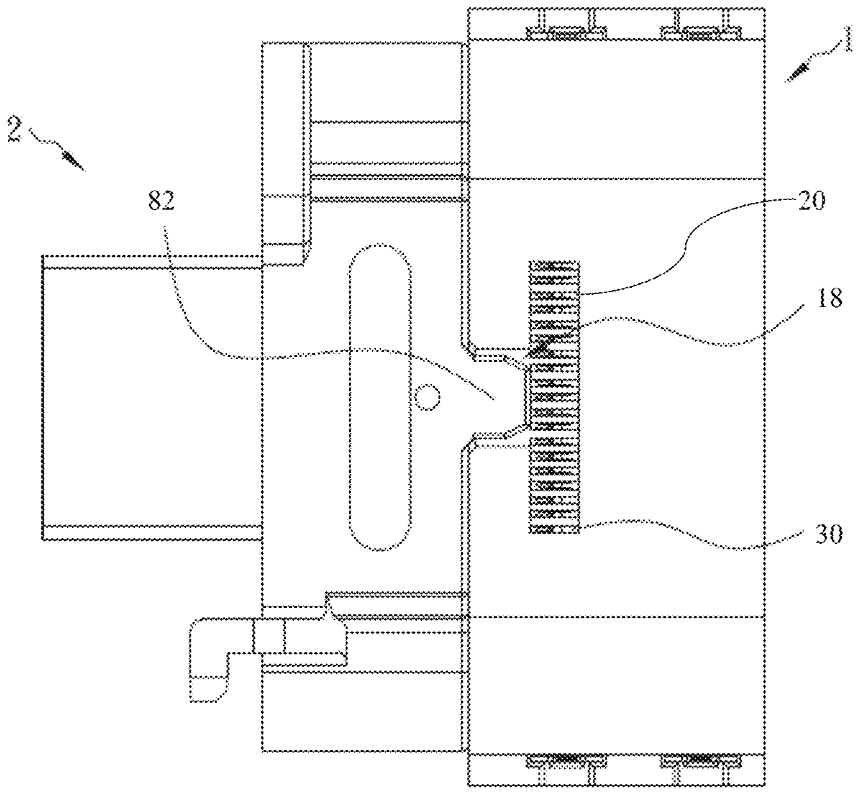
FIG. 11C shows that connectors of FIG. 11A in a fully mated position, according to some embodiments of the present invention.

FIG. 11A shows a top plan view of the receptacle connector 1 and the plug connector 2 prior to mating. According to some embodiments of the present invention, blind mating of the connectors 1, 2 may occur in a plurality of phases due to a plurality of different lengths of the mating protrusions 80, the support ribs 90, and the alignment tab 82 relative to the surface 84 of the housing 81 of the plug connector 2, resulting in mating protrusions 80, the support ribs 90, and the alignment tab 82 coming into contact with the front surface 14*f* of the housing 14 of the receptacle connector 1 at different times. In some embodiments, the mating protrusions may have a length D1, the support ribs 90 may have length D2, and the alignment tab may have a length D3, with D1>D2>D3. In some embodiments, a first phase of a blind mating operation may involve a user touching the receptacle connector 1 to determine a location of the guide groove 18, to determine the locations of the top and front surfaces 14*t*, 14*f* of the receptacle connector. The first phase also may involve the user touching the plug connector 2 to determine a location of the alignment tab 82, to determine the top side of the plug connector 2 and therefore to determine how to hold the plug connector 2 such that the top side is oriented properly with respect to the guide groove 18. A second phase of the blind mating operation may involve the user aligning the mating protrusions 80 of the plug connector 2 with the guide holes 16 of the receptacle connector 1 by getting the plug and receptacle connectors 2, 1 sufficiently close that tips of the mating protrusions 80 of the plug connector 2 are within an outer diameter or edge of the end portions 16*a* of the guide holes 16. As discussed above, the inclined walls of the end portions 16*a* of the guide holes 16 may enable the tapered end 80*a* of the mating protrusions 80 to slide relative to each other, thus causing the mating protrusions 80 to become centered in the guide holes 16. By permitting such sliding to occur, a certain amount of misalignment is tolerable. In some embodiments, the tolerable misalignment Δ may be approximately 2 mm. The second phase may include sliding of the tapered ends 80*a* into the guide holes 16 via the end portions 16*a* of the guide holes. A third phase of the blind mating operation may involve the user ascertaining that the support ribs 90 of the plug connector 2 with the end portions 10*b* of the mating groove 10 of the receptacle connector 1 are sufficiently aligned prior to applying a mating force. For example, the user may use touch to feel the connectors 1, 2 relative to each other and to determine that a proper initial engagement of the connectors 1, 2 has occurred. FIG. 11B depicts the connectors 1, 2, in the third phase of the blind mating operation. After the user determines that the insertion ends 90*a* of the supporting ribs 90 are centered in the end portions 10*b* by, e.g., sliding the inclined walls 90*b* relative to the inclined walls 10*d*, as discussed above, the user may exert additional force in the M direction to insert the circuit board 86 in the central portion 10*a* of the mating groove 10. A fourth phase of the blind mating operation may involve the user aligning the alignment tab 82 with the guide groove 18 or confirming that the alignment tab 82 is aligned with the guide groove 18. As discussed above, the end portion 18*a* of the guide groove 18 may be flared or may have chambers, to facilitate aligning or centering of the alignment tab 82 in the guide groove 18. Once aligned, the user may apply a mating force in the M direction, to urge the plug connector 2 against the receptacle connector 1 to achieve a fully mated position, as depicted in FIG. 11C. In some embodiments, the length D3 of the alignment tab 82 may be such that the alignment tab 82 does not block the hole 20 through which heat may escape, as discussed above.

Figure 12A:
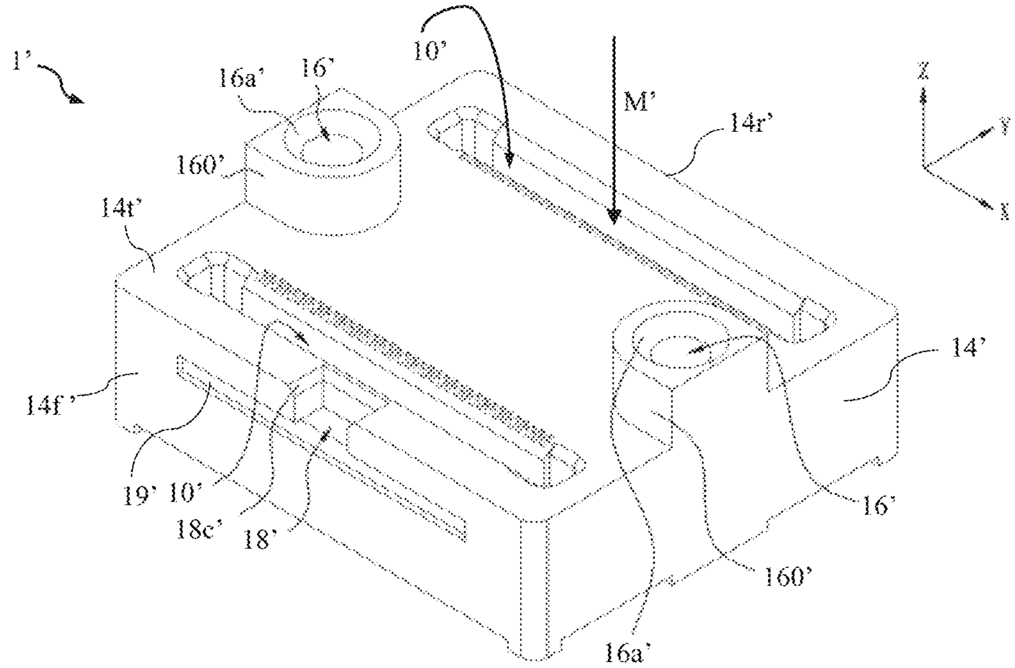
FIG. 12A shows a top perspective view of an electrical connector, according to some embodiments of the present invention.
Figure 12B:
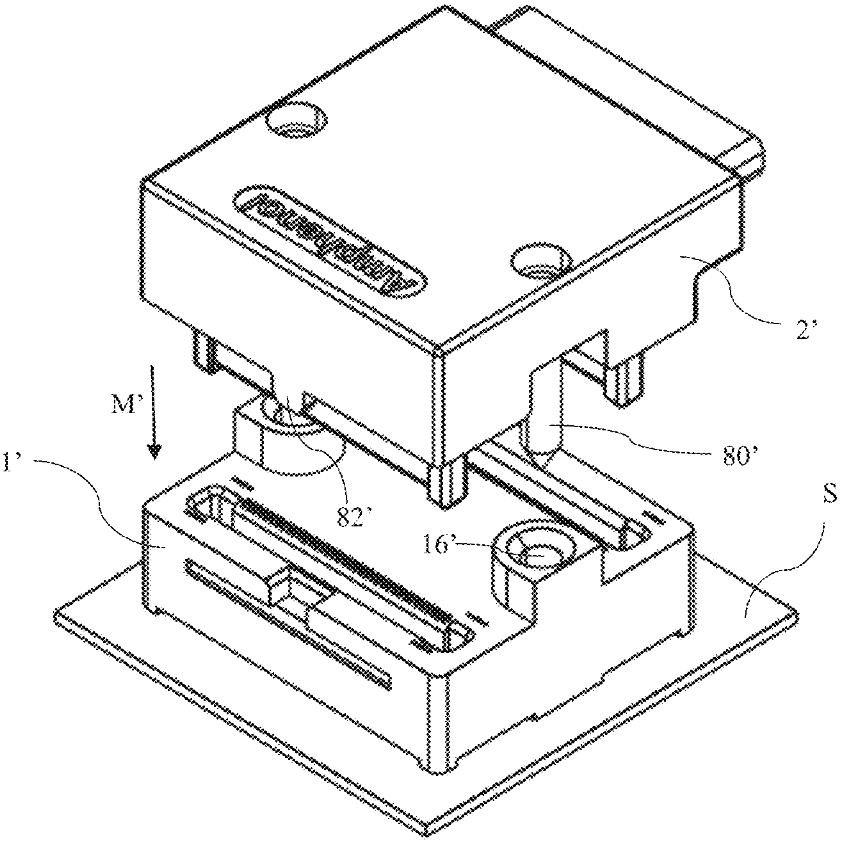
FIG. 12B shows a perspective view of the electrical connector of FIG. 12A spaced apart from a mating connector useable with the electrical connector, according to some embodiments of the present invention.

FIG. 12A shows a top perspective view of an electrical connector 1', according to some embodiments of the present invention. In some embodiments, the electrical connector 1' may be a vertical-type board-end connector, and may be structured to receive and electrically connect to a pair of circuit boards inserted vertically into respective mating grooves 10' in an insertion direction M', which may be parallel to the Z direction. FIG. 12B shows an example of the electrical connector 1' mounted on a substrate S, which may be a printed circuit board. In some embodiments, the electrical connector 1' may be a receptacle connector configured to mate with a plug connector 2'. In FIG. 12B, the plug connector 2' is shown spaced apart from the electrical connector 1' and positioned to mate with the electrical connector 1' by movement in the insertion direction M'. In some embodiments, the electrical connector 1' may be a variation of the electrical connector 1 and therefore similar components may be labeled with the same reference number modified with an added apostrophe, but will not be described in detail again except to point out differences. The components of the electrical connector 1' may have different relative positions and/or different relative quantities compared with the electrical connector 1.

As shown in FIG. 12A, a top surface 14*t*' of the housing 14' of the electrical connector 1' may be provided with two mating grooves 10' respectively positioned near front and rear sides 14*f*', 14*r*' of the housing 14'. In some embodiments, the top surface 14*t*' may be a mating surface of the electrical connector 1'.

In some embodiments of the present invention, the top surface 14*t*' of the housing 14' also may be provided with one or more guide posts 160'. For example, a pair of guide posts 160' may be positioned respectively on opposite sides of the top surface 14*t*' (e.g., on left and right sides), as shown in FIG. 12A. Each guide post 160' may be a protrusion that extends in the Z direction from the top surface 14*t*'. In some embodiments, the guide holes 16' may be located in the guide posts 160' such that each guide hole 16' may extend parallel to the Z direction. An insertion axis of each of the guide holes 16' may be parallel to the mating direction M'. For example, the guide holes 16' may be configured to receive mating protrusions 80' of the plug connector 2', as depicted in FIG. 12B. By structuring the guide posts 160' to extend outwards from the top surface 14*t*' of the housing 14', the electrical connector 1' may enable a mating connector (e.g., the plug connector 2') to align properly with the electrical connector 1' before circuit boards of the mating connector come into contact with the mating grooves 10'. This may prevent the circuit boards and/or electrical contact portions of the circuit boards from being damaged inadvertently during a blind mating operation, if the circuit boards are misaligned with the mating grooves 10'. In some embodiments, at least one guide hole 16' may extend parallel to the Z direction into the housing 14' beyond the top surface 14*t*' of the housing 14', such that part of the guide hole 16' extends in the guide post 160' and part of the guide hole 16' extends into the housing 14'. In some other embodiments, at least one guide hole 16' has a shallower depth such that no portion of the guide hole 16' extends into the housing 14'. In some embodiments, a portion of the top surface 14*t*' of the housing 14' between the guide posts 160' may be flat, as shown in FIG. 12A.

In the embodiments of the present invention, the guide groove 18' of the electrical connector 1' may not be connected to any of the mating grooves 10', unlike the guide groove 18 of the electrical connector 1 discussed above. Instead, the guide groove 18' of the electrical connector 1' may be a recess in the top surface 14*t*' of the housing 14' and may be configured to receive a mating tab of a mating connector inserted in the mating direction M'. For example, the plug connector 2' may include a tab 82' configured to be seated in the guide groove 18' when the plug connector 2' and the electrical connector 1' are mated together. In some embodiments, the guide groove 18' may be located at or near the front side 14*f*' of the housing 14*f*' and may be used to identify the front side 14*f*' of the electrical connector 1' relative to a rear side of the electrical connector 1'.

In some embodiments of the present invention, a vent hole 19' may extend from the front side 14*f*' of the housing 14' to the mating groove 10' nearest the front side 14*f*', such that part of a terminal assembly of the electrical connector 1' may be seen through the hole 19'. The hole 19' may serve as a heat conduit that enables heat generated by terminals of the terminal assembly to escape from the housing 14' through the hole 19', similar to the hole 20 of the electrical connector 1 discussed above. In some embodiments, the hole 19' may be provided for each mating groove 10' of the electrical connector 1'. Optionally, in some embodiments, an inner end of the guide groove 18' may be connected to the hole 19'

In some embodiments of the present invention, a surface edge of the guide groove 18', adjacent the top surface **14*t*' of the housing 14', may be comprised of an inclined wall 18*c*', such that a width of the guide groove 18' at the surface edge may be greater than a width of the guide groove below the surface edge. For example, the inclined wall 18*c*' may be a chamber (e.g., a bevel). The wider width of the guide groove 18' at the surface edge may facilitate initial positioning of a mating connector's mating tab (e.g., the tab 82') in the guide groove 18' prior to applying pressure to cause the mating tab to be fully seated in the guide groove 18', which may be advantageous in a blind mating operation. Similarly, a surface edge or end portion of each guide hole 16' may be comprised of an end portion 16*a*' that includes an inclined wall, which may facilitate initial positioning of a mating connector's mating protrusions (e.g., the protrusions 80') in the guide holes 16' prior to applying pressure to cause the mating protrusions to be fully inserted in the guide groove holes 16' and therefore may be advantageous in a blind mating operation. In some embodiments, a bottom or depth of the guide groove 18' in the Z direction, relative to the top surface of the housing 14', may be different from a bottom or depth of the guide holes 16', which may deter inadvertent disconnection of a mating connector that is fully mated with the electrical connector 1'**.

Figure 13A:
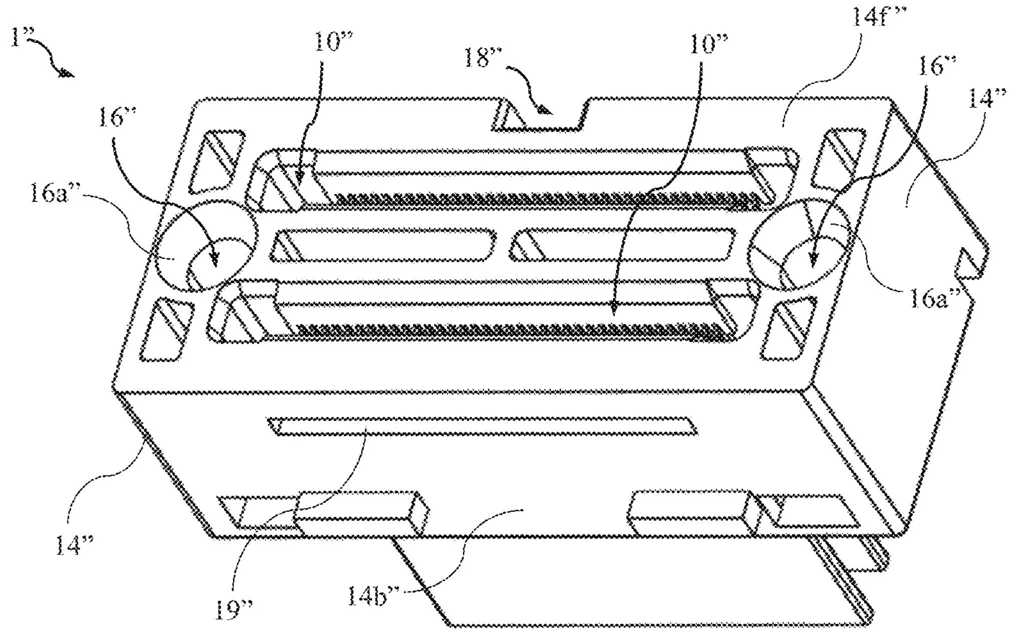
FIGS. 13A and 13B show a bottom perspective view and a front elevational view, respectively, of an electrical connector, according to some embodiments of the present invention.
Figure 13B:
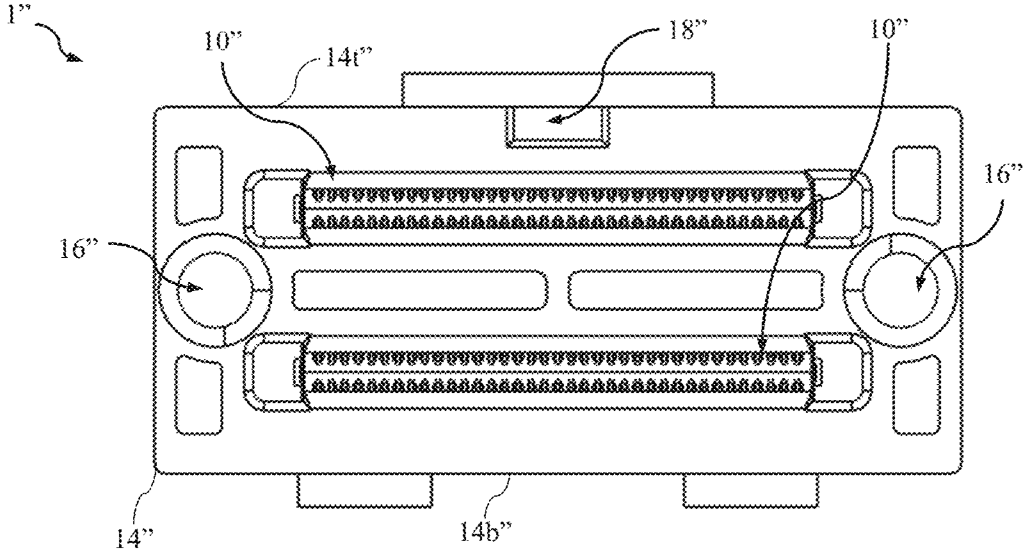
Figure 13C:
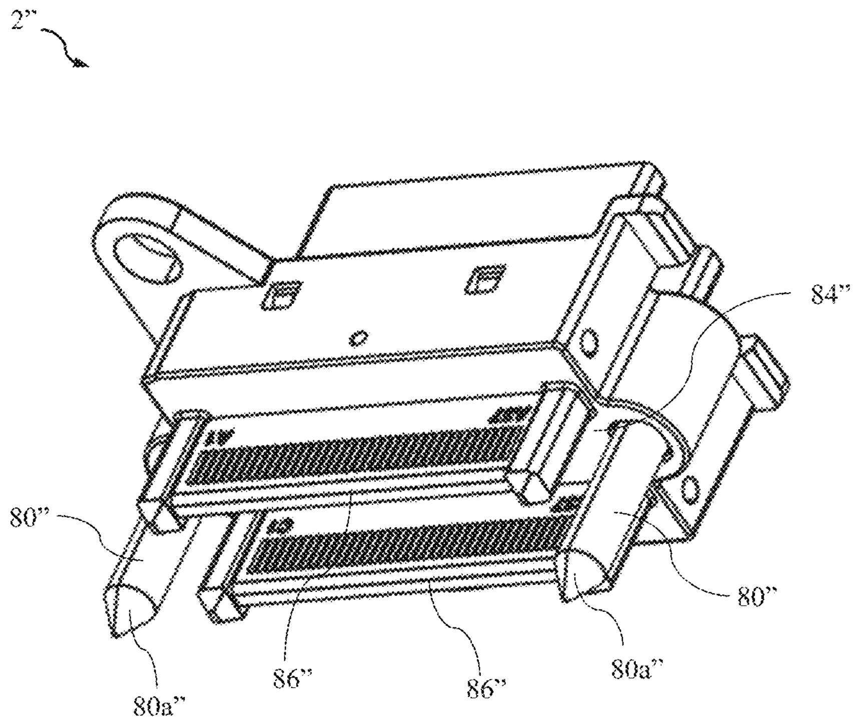
FIG. 13C shows a perspective view of a mating connector useable with the electrical connector of FIG. 13A, according to some embodiments of the present invention.

FIGS. 13A and 13B show a bottom perspective view and a front elevational view, respectively, of an electrical connector 1", according to some embodiments of the present invention. In some embodiments, the electrical connector 1" may be a horizontal-type board-end connector, and may be structured to receive and electrically connect to a pair of circuit boards inserted horizontally into respective mating grooves 10". In some embodiments, the electrical connector 1" may be a receptacle connector configured to mate with a plug connector 2", an embodiment of which is shown in FIG. 13C, in a bottom perspective view. In some embodiments, the electrical connector 1" may be a variation of the electrical connector 1 and the electrical connector 1' and therefore similar components may be labeled with the same reference number modified with a double apostrophe, but will not be described in detail again except to point out differences. The components of the electrical connector 1" may have different relative positions and/or different relative quantities compared with the electrical connector 1' and/or the electrical connector 1.

As shown in FIGS. 13A and 13B, a front surface **14*f*" of the housing 14" of the electrical connector 1" may be provided with two mating grooves 10" respectively positioned near top and bottom surfaces 14*t*", 14*b*" of the housing 14", according to some embodiments of the present invention. In some embodiments, the front surface 14*f*" of the housing 14" also may be provided with guide holes 16" that extend into the housing 14" parallel to the mating grooves 10". That is, an insertion axis of each of the guide holes 16" may be parallel to an insertion direction of the matting grooves 10". In some embodiments, a pair of guide holes 16" may be positioned respectively at opposite ends of the mating grooves 10" such that one guide hole 16" may be situated partially or wholly between left ends of the mating grooves 10" and another guide hole 16" may be situated partially between right ends of the mating grooves 10". In some other embodiments, the guide holes 16" may be situated such that no part of the guide holes 16" is positioned between the mating grooves 10". As will be appreciated, the guide holes 16" may be positioned at different locations than those specifically described herein. Unlike the electrical connector 1', the guide holes 16" extend from the front surface 14*f*" of the housing 14" and therefore no part of the guide holes 16" is raised beyond the front surface 14*f*". As can be seen in FIG. 13A, unlike the electrical connector 1', the electrical connector 1" does not include guide posts (e.g., the guide posts 160), i.e., a surface edge of the guide holes 16" coincides with the front surface 14*f*" of the housing 14"**.

According to some embodiments of the present invention, the guide holes 16" may be configured to receive mating protrusions 80" of the plug connector 2", as depicted in FIG. 13C. In some embodiments, a bottom surface of the guide holes 16" may be at a depth that greater is greater than a depth of a bottom surface of the mating grooves 10". This difference in depths may enable the mating protrusions 80" to engage with the guide holes 16" of the electrical connector 1" before any other portion of the plug connector 2" engages with the electrical connector 1". For example, the relatively deeper guide holes 16" may enable the mating protrusions 80" to extend relatively farther from a surface 84" of the plug connector 2" than an outer edge of circuit boards 86" of the plug connector 2", thus enabling proper alignment of the plug connector 2" with the electrical connector 1" via the mating protrusions 80" before a mating force is applied to seat the circuit boards 86" in the mating grooves 10". Proper alignment may prevent damage to the circuit boards 86" caused by application of the mating force when the circuit boards 86" are misaligned while the mating force is applied to mate the connectors 1", 2" together. In some embodiments, the bottom of the guide holes 16" may be tapered to conform to a tapered profile of ends of the mating protrusions 80". For example, each guide hole 16" may have a conically shaped bottom surface (not shown) configured to conform with a conically shaped end **80*a*" of the mating protrusion 80". In some other embodiments, the bottom surface of the guide hole 16" may not have a tapered profile but may have another profile that conforms with a profile of the mating protrusion 80". In some embodiments, the guide holes 16" may be through-holes that extend from the front surface 14*f*" to a rear surface of the housing 14"**.

Returning to FIGS. 13A and 13B, the front surface **14*f*" of the housing 14" may be provided with a guide groove 18" configured to receive a tab of a mating connector when the tab is inserted in the guide groove 18" during a mating operation, according to some embodiments of the present invention. In some embodiments, a hole 19" may be provided on the bottom surface 14*b*" of the housing 14". The hole 19" may serve as a heat conduit that enables heat generated by terminals of a terminal assembly to escape from the housing 14" through the hole 19", similar to the hole 19' and the hole 20 discussed above. In some embodiments, a similar hole may be provided for each mating groove 10" of the electrical connector 1", for enabling heat to escape. For example, similar to the electrical connector 1 shown in FIGS. 1A and 1B, an inner end of the guide groove 18" may be connected to a hole extending from the top side 14*t*" of the housing 14" to the mating groove 10" nearest the top side 14*t*"**, to enable heat to escape.

In some embodiments of the present invention, a surface edge or end portion of each guide hole 16" may be comprised of an end portion **16*a*" having a frustoconical shape, which may facilitate initial positioning of a mating connector's mating protrusions (e.g., the protrusions 80") in the guide holes 16" prior to applying pressure to cause the mating protrusions to be fully inserted in the guide groove holes 16" and therefore may be advantageous in a blind mating operation. In some embodiments, the frustoconically shaped end portions 16***a*" may provide a sliding surface for a slightly misaligned conically shaped end 80*a*" of the mating protrusion to slide into alignment with the guide hole 16", as discussed above.

It is to be understood that the foregoing features may be used, separately or together in any combination, in any of the embodiments discussed herein.

Further, although advantages of the present technology may be indicated, it should be appreciated that not every embodiment of the present technology may include every described advantage. Some embodiments may not implement any feature described herein as advantageous. Accordingly, the foregoing description and attached drawings are by way of example only.

Variations of the disclosed embodiments are possible. For example, various aspects of the present technology may be used alone, in combination, or in a variety of arrangements not specifically discussed in the embodiments described in the foregoing, and therefore they are not limited in application to the details and arrangements of components set forth in the foregoing description or illustrated in the drawings. Aspects described in one embodiment may be combined in any manner with aspects described in other embodiments.

Use of ordinal terms such as "first," "second," "third," etc., in the description and the claims to modify an element does not by itself connote any priority, precedence, or order of one element over another, or the temporal order in which acts of a method are performed, but are used merely as labels to distinguish one element or act having a certain name from another element or act having a same name (but for use of the ordinal term) to distinguish the elements or acts.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

As used herein in the specification and in the claims, the term "equal" or "the same" in reference to two values (e.g., distances, widths, etc.) means that two values are the same within manufacturing tolerances. Thus, two values being equal, or the same, may mean that the two values are different from one another by ±5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Finally, it is to be understood that the scope of the present invention is not limited to claims recited below or the embodiments described herein and shown in the drawings. It is to be understood that the scope of the invention and the claims includes equivalent modifications and variations that can be conceived by one of ordinary skill in the art based on the disclosure of the present technology.

What is claimed is:

1. An electrical connector, comprising:
- an insulative housing;
- a first terminal assembly disposed at least partially in the housing;
- a plurality of first guide features supported by the housing, each of the first guide features extending parallel to an insertion direction;
- a second guide feature supported by the housing and extending parallel to the insertion direction;
- a first mating feature supported by the housing and extending parallel to the insertion direction, the first mating feature being configured to contact a first contact portion of a mating connector and to enable the first contact portion to contact the first terminal assembly; and
- a plurality of third guide features supported by the housing, each of the third guide features extending parallel to the insertion direction, wherein the first mating feature is positioned between two of the third guide features.

2. The electrical connector of claim 1, wherein each of the first guide features extends from a mating surface of the housing such that a surface edge of each of the first guide features coincides with the mating surface of the housing.

3. The electrical connector of claim 1, further comprising: a plurality of guide posts protruding from a mating surface of the housing, wherein the first guide features are guide holes respectively disposed in the guide posts such that a surface edge of each of the guide holes coincides with a mating surface of a corresponding one of the guide posts.

4. The electrical connector of claim 1, wherein each of the first guide features is comprised of an end portion that includes an inclined wall.

5. The electrical connector of claim 4, wherein the inclined wall of the end portion of each of the first guide features has a frustoconical shape.

6. The electrical connector of claim 1, wherein each of the first guide features is spaced apart from the first mating feature.

7. The electrical connector of claim 1, wherein the first mating feature is positioned between and contiguous with two of the first guide features.

8. The electrical connector of claim 1, wherein the second guide feature is comprised of a plurality of inclined surfaces located at an outer edge of the second guide feature, each of the inclined surfaces being inclined relative to a mating surface of the housing.

9. The electrical connector of claim 1, wherein an edge of a mating surface of the housing has a stepped structure comprised of at least three steps of different heights.

10. The electrical connector of claim 1, wherein a dimension d1 of the first guide features in a direction parallel to the insertion direction is different from a dimension d2 of end sections of the first mating feature.

11. The electrical connector of claim 10, wherein a dimension d3 of the second guide feature is different from d1 and different from d2.

12. The electrical connector of claim 1, wherein the two of the third guide features are posts positioned on opposite ends of the first mating feature, and two of the first guide features are metal posts positioned such that the two of the third guide features and the first mating feature positioned between the two of the third guide features are all arranged between the two of the first guide features.

13. The electrical connector of claim 1, wherein: the first mating feature is elongated in a longitudinal direction perpendicular to the insertion direction, the first mating feature, the first guide features, and the two of the third guide features have a common first centerline extending in the longitudinal direction, and the first mating feature and the second guide feature have a common second centerline extending in a vertical direction perpendicular to the longitudinal direction and perpendicular to the insertion direction.

14. The electrical connector of claim 1, wherein: the insulative housing is comprised of a mating surface having an edge; the first mating feature is a mating groove extending into the mating surface; and the second guide feature is a second groove extending into the mating surface adjacent the edge.

15. An electrical connector, comprising:

an insulative housing;

a first terminal assembly disposed at least partially in the housing;

a plurality of guide holes disposed in the housing, each of the guide holes extending parallel to an insertion direction;

a guide groove disposed in the housing and extending parallel to the insertion direction;

a first mating groove disposed in the housing and extending parallel to the insertion direction, the first mating groove being configured to receive a first contact portion of a mating connector and to enable the first contact portion to contact the first terminal assembly; and a first vent hole disposed in the housing, wherein a portion of the first terminal assembly is directly exposed through the first vent hole, wherein the first mating groove is comprised of a central section positioned between two end sections, and wherein a height of the central section in a direction perpendicular to the insertion direction is smaller than a height of each of end sections.

16. The electrical connector of claim 15, wherein an edge portion of each of the end sections of the first mating groove has a curved shape adjacent the mating surface of the housing.

17. The electrical connector of claim 15, wherein each of the end sections of the first mating groove is comprised of at least one inclined wall.

18. The electrical connector of claim 15, further comprising: a second terminal assembly disposed at least partially in the housing; and a second mating groove disposed in the housing and extending parallel to the insertion direction, the second mating groove being configured to receive a second contact portion of the mating connector and to enable the second contact portion to contact the second terminal assembly.

19. The electrical connector of claim 15, further comprising: a plurality of guide posts protruding from a mating surface of the housing, wherein the guide holes are respectively disposed in the guide posts such that a surface edge of each of the guide holes coincides with a mating surface of a corresponding one of the guide posts.

20. The electrical connector of claim 15, wherein a portion of each of the guide holes is located between the first and second mating grooves.

21. A method of connecting electrical connectors, the method comprising:

bringing together first and second electrical connectors such that an end of a first protrusion of the first connector is within an outer perimeter of a first opening of the second connector;

performing a first alignment by causing the end of the first protrusion of the first connector to slide along an inclined wall adjacent the outer perimeter of the first opening of the second connector, to align the first protrusion of the first connector in the first opening of the second connector;

after the first alignment, performing a second alignment by causing an end of a second protrusion of the first connector to be centered with a second opening of second connector, wherein the second opening is an extension of a groove that includes a terminal assembly of the second connector;

causing a third protrusion of the first connector to engage with a third opening of the second connector, wherein the first opening and the third opening are distinct from the groove; and applying a mating force in an insertion direction to seat the first protrusion in the first opening, to seat the second protrusion in the second opening, and to seat the third protrusion in the third opening.

22. The method of claim 21, wherein the performing of the first alignment causes the first and second connectors to shift in a direction perpendicular to the insertion direction by approximately 2 mm or less.

23. The method of claim 21, wherein: the first protrusion extends a distance D1 from a mating surface of the first connector, the second protrusion extends a distance D2 from the mating surface, with D2 being less than D1, and the third protrusion extends a distance D3 from the mating surface, with D3 being less than D2.

24. The method of claim 21, wherein: the performing of the second alignment is comprised of causing an inclined wall of the second protrusion to move relative to an inclined wall of the second opening, and the causing of the third protrusion to engage with the third opening is comprised of causing an end of the third protrusion to move relative to an inclined wall of the third opening.

* * * * *